(12) United States Patent
Momosaki

(10) Patent No.: US 8,396,332 B2
(45) Date of Patent: Mar. 12, 2013

(54) ELECTRONIC APPARATUS AND FACE IMAGE DISPLAY METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/401,438

(22) Filed: Feb. 21, 2012

(65) Prior Publication Data

US 2012/0155829 A1    Jun. 21, 2012

Related U.S. Application Data

(63) Continuation of application No. 12/203,822, filed on Sep. 3, 2008, now abandoned.

(30) Foreign Application Priority Data

Sep. 18, 2007   (JP) ................................ 2007-241516

(51) Int. Cl.
G06K 9/60    (2006.01)
G06K 9/00    (2006.01)
G06K 9/62    (2006.01)

(52) U.S. Cl. ......... 382/305; 382/118; 382/224; 382/225

(58) Field of Classification Search .................. 382/305, 382/118, 224, 225
See application file for complete search history.

(56) References Cited

U.S. PATENT DOCUMENTS

| 6,734,877 | B1 * | 5/2004 | Kondo et al. ................ 715/721 |
| 7,979,879 | B2 * | 7/2011 | Kazama et al. ................ 725/41 |
| 8,103,062 | B2 * | 1/2012 | Abe et al. ...................... 382/118 |
| 8,170,269 | B2 * | 5/2012 | Murata et al. ................ 382/100 |
| 2002/0056095 | A1 * | 5/2002 | Uehara et al. .................. 725/38 |
| 2003/0184598 | A1 * | 10/2003 | Graham ........................ 345/838 |
| 2004/0019608 | A1 * | 1/2004 | Obrador ....................... 707/104.1 |
| 2005/0259959 | A1 * | 11/2005 | Nagao et al. ..................... 386/69 |
| 2007/0274596 | A1 * | 11/2007 | Murata et al. ................. 382/209 |
| 2008/0055469 | A1 * | 3/2008 | Miyasaka et al. ............. 348/521 |
| 2008/0080743 | A1 * | 4/2008 | Schneiderman et al. ..... 382/118 |
| 2008/0155627 | A1 * | 6/2008 | O'Connor et al. ............ 725/109 |
| 2008/0166027 | A1 * | 7/2008 | Jeong et al. ................... 382/118 |
| 2009/0074304 | A1 | 3/2009 | Momosaki |

FOREIGN PATENT DOCUMENTS

| JP | 10-032773 | 2/1998 |
| JP | 10-285523 | 10/1998 |
| JP | 2001-309269 | 11/2001 |
| JP | 2004-508757 | 3/2004 |
| JP | 2004-274768 | 9/2004 |

OTHER PUBLICATIONS

U.S. Appl. No. 12/203,822, Notice of Allowance, mailed Nov. 21, 2011.
Wei, G.; Agnihotri, L.; Dimitrova, N.;, "Tv program classification based on face and text processing," Multimedia and Expo, 2000. ICME 2000 IEEE International Conference on , vol. 3, no., pp. 1345-1348 vol. 3, 2000.

* cited by examiner

*Primary Examiner* — Bhavesh Mehta
*Assistant Examiner* — Utpal Shah
(74) *Attorney, Agent, or Firm* — Blakely, Sokoloff, Taylor & Zafman LLP

(57) ABSTRACT

According to one embodiment, a face image list display process module classifies face images, which are extracted from video content data, into a first face image group belonging to a predetermined attribute section and a second face image group belonging to sections other than the predetermined attribute section. The face image list display process module displays, on a face thumbnail display area, the face images belonging to one group of the first face image group and the second face image group in such a manner that the face images belonging to the one group are distinguished from the face images belonging to the other group of the first face image group and the second face image group.

19 Claims, 14 Drawing Sheets

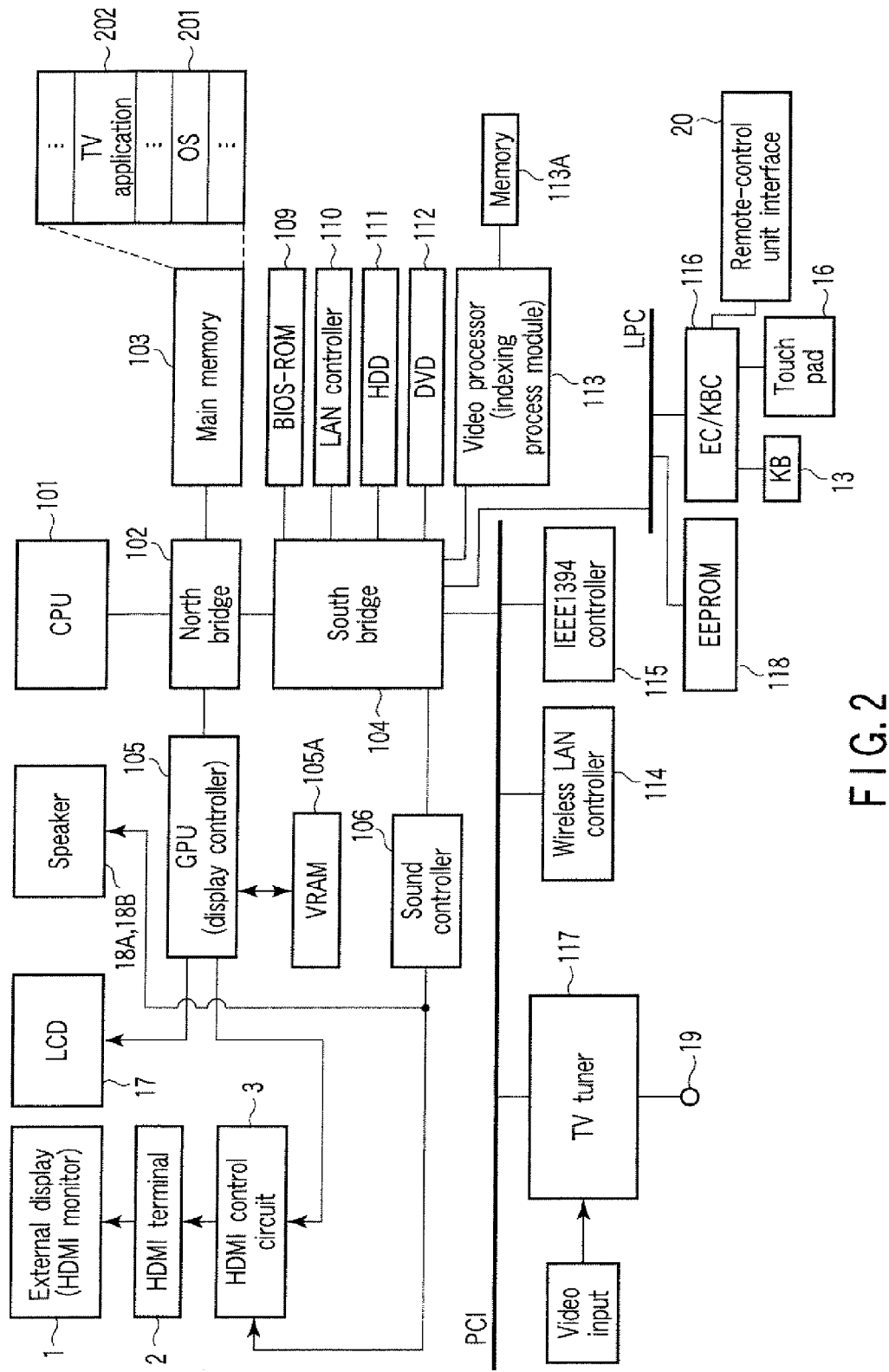
F I G. 2

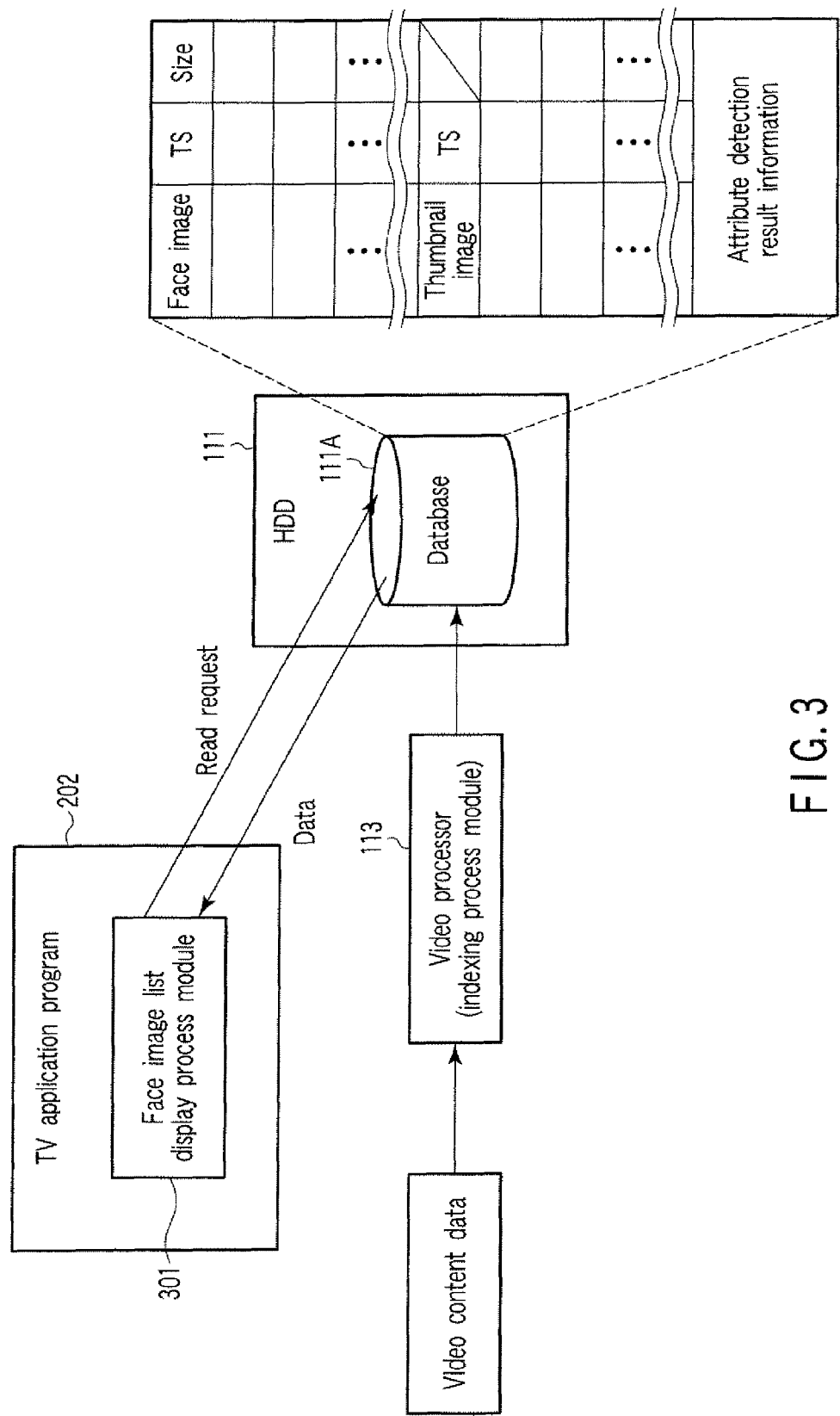
F I G. 3

Attribute detection result information

CM section table

| CM section 1 | Start time, end time |
|---|---|
| CM section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer/excitement level table

| Time | Cheer level | Excitement level |
|---|---|---|
| T1 | 10 | 5 |
| T2 | 20 | 5 |
| T3 | 10 | 6 |
| ⋮ | ⋮ | ⋮ |

FIG. 4

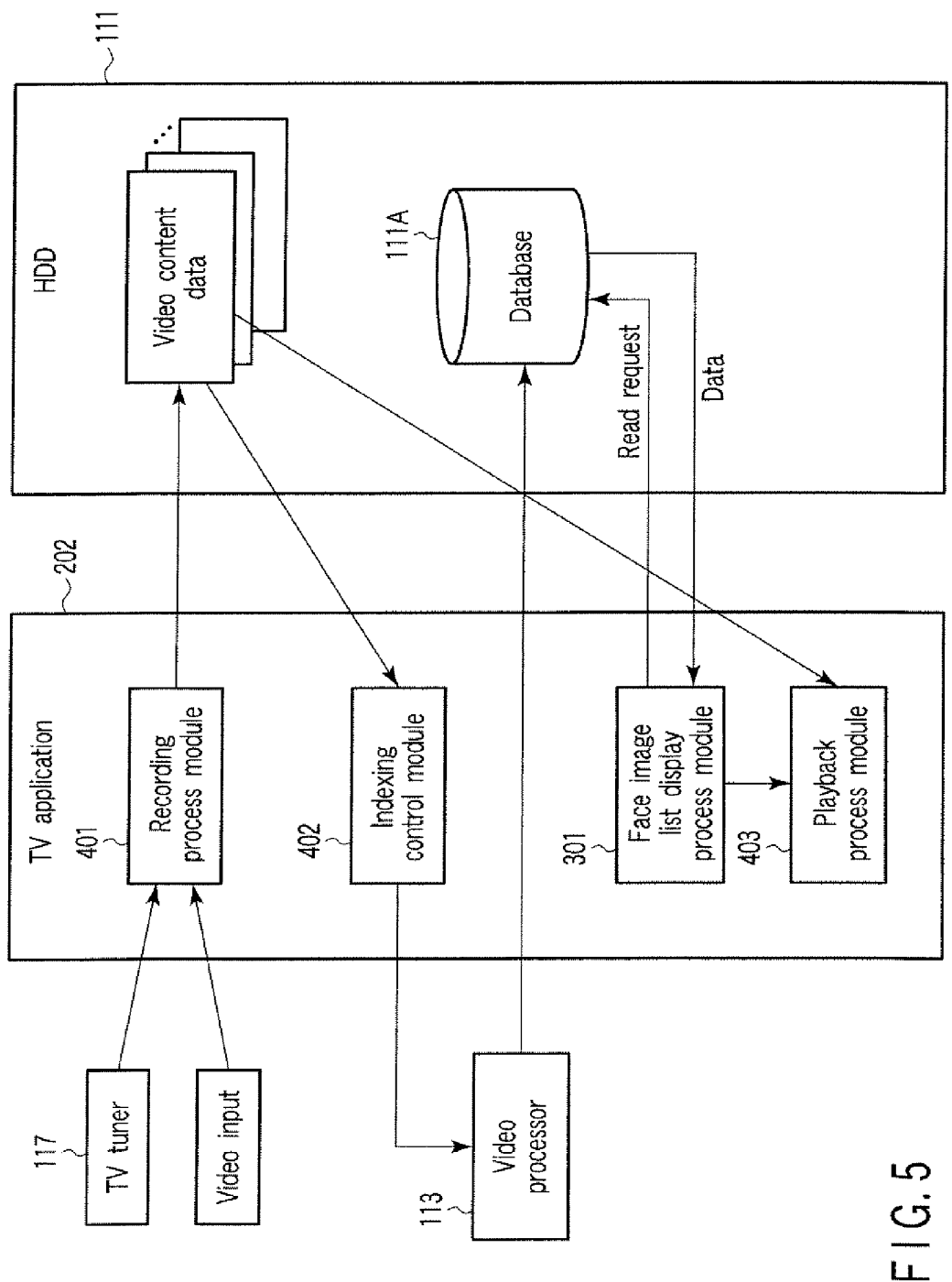
F I G. 5

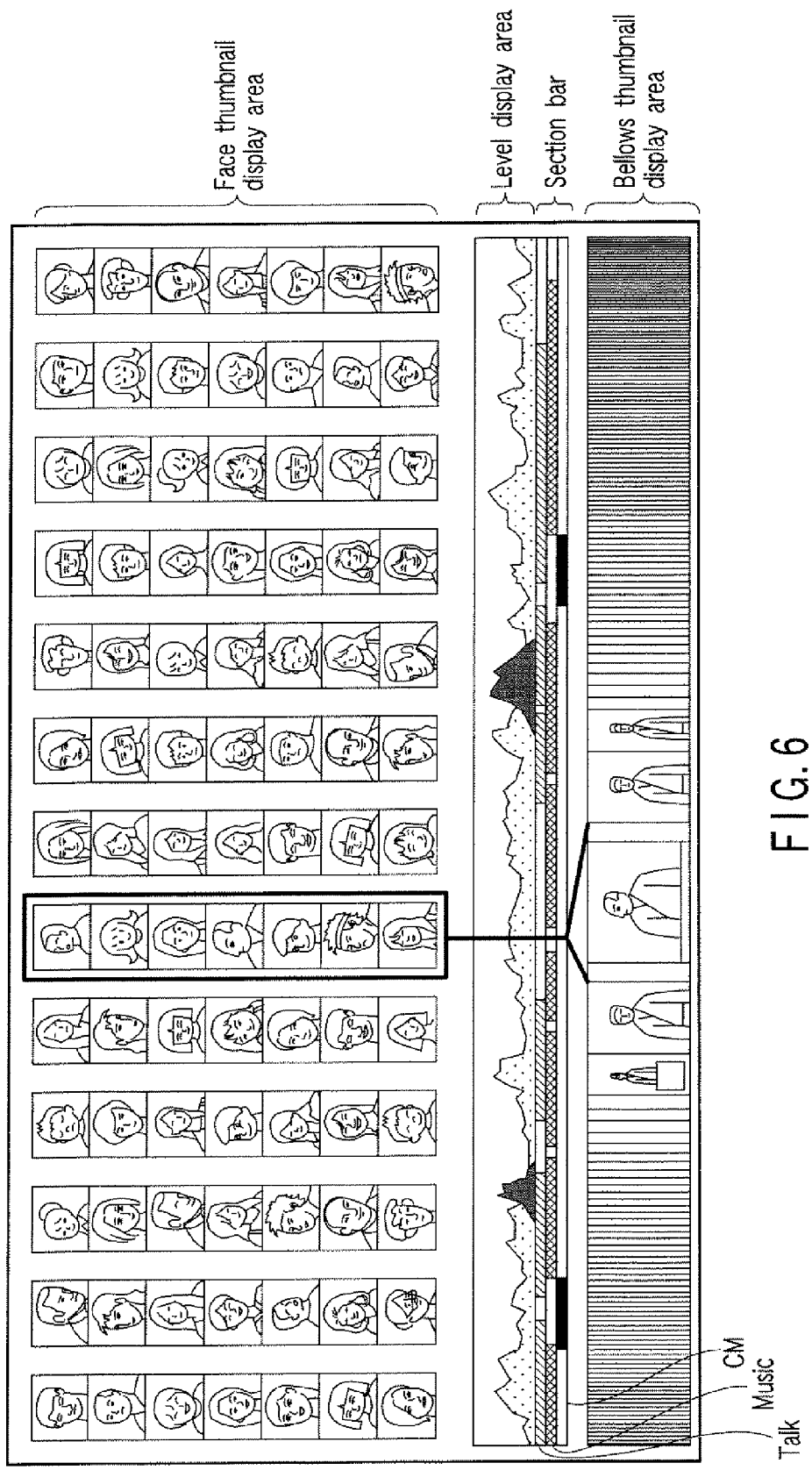
F I G. 6

ELECTRONIC APPARATUS AND FACE IMAGE DISPLAY METHOD

CROSS-REFERENCE TO RELATED APPLICATIONS

This application is a Continuation application of U.S. application Ser. No. 12/203,822, filed Sep. 3, 2008, now abandoned, which claims the benefit of priority from Japanese Patent Application No. 2007-241516, filed Sep. 18, 2007, the entire contents of which are incorporated herein by reference.

BACKGROUND

1. Field

One embodiment of the invention relates to an electronic apparatus and a face image display method for displaying a face image which appears in video content data.

2. Description of the Related Art

In general, an electronic apparatus, such as a video recorder or a personal computer, is capable of recording and playing back various video content data such as TV broadcast program data. In this case, although titles are added to the respective video content data stored in the electronic apparatus, it is difficult for a user to understand, from the title alone, what kind of content each video content data has. In order to understand the content of each video content data, it is thus necessary to play back the video content data. In the case of playing back video content data of a long total time, however, even if a quick forward function or the like is used, a great deal of time is needed.

Jpn. Pat. Appln. KOKAI Publication No. 2001-309269 discloses an apparatus having an appearing person list display function. This apparatus has a function of displaying, in an arranged order, the face images of persons appearing in video content as a list of persons appearing in the video content.

In usual cases, many video content data include a plurality of kinds of attribute sections, such as a commercial section and other sections.

However, in the appearing person list display function of Jpn. Pat. Appln. KOKAI Publication No. 2001-309269, no consideration is given to the attribute section, and the images of the faces of the appearing persons are simply displayed. It is thus necessary to realize a novel function of presenting, to the user, in which kind of attribute section each face image appears.

In addition, if the list of appearing persons is merely displayed as in KOKAI No. 2001-309269, the user cannot understand in which of time zones of the video content data such persons appear. It is necessary, therefore, to realize a novel function for presenting which persons appear in which time zones in the whole video content data.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of the system configuration of the electronic apparatus according to the embodiment;

FIG. 3 is an exemplary block diagram for describing a face image list display function of the electronic apparatus according to the embodiment;

FIG. 4 shows an example of section attribute information (attribute detection result information) which is used in the electronic apparatus according to the embodiment;

FIG. 5 is an exemplary block diagram showing the functional configuration of a program which is used in the electronic apparatus according to the embodiment;

FIG. 6 shows an example of an indexing view screen which is displayed on a display device by the electronic apparatus according to the embodiment;

DETAILED DESCRIPTION

Various embodiments according to the invention will be described hereinafter with reference to the accompanying drawings. In general, according to one embodiment of the invention, there is provided an electronic apparatus comprising: a storage device which stores face image indexing information including a plurality of face images, which are extracted from video content data, and time stamp information which is indicative of a time point at which each of the face images appears in the video content data, and stores section attribute information which specifies a start time point and an end time point of at least one predetermined attribute section of a plurality of attribute sections including a commercial section, a music section in which music is played and a talk section in which a talk is made, the plurality of attribute sections being included in the video content data; and a face image list display process module configured to classify, on the basis of the section attribute information and the time stamp information corresponding to each of the plurality of face images, the plurality of face images, which are included in the face image indexing information, into a first face image group belonging to the predetermined attribute section and a second face image group belonging to the sections other than the predetermined attribute section, and to display, on a display area, the face images belonging to one group of the first face image group and the second face image group in such a manner that the face images belonging to the one group are distinguished from the face images belonging to the other group of the first face image group and the second face image group.

Figure 1:
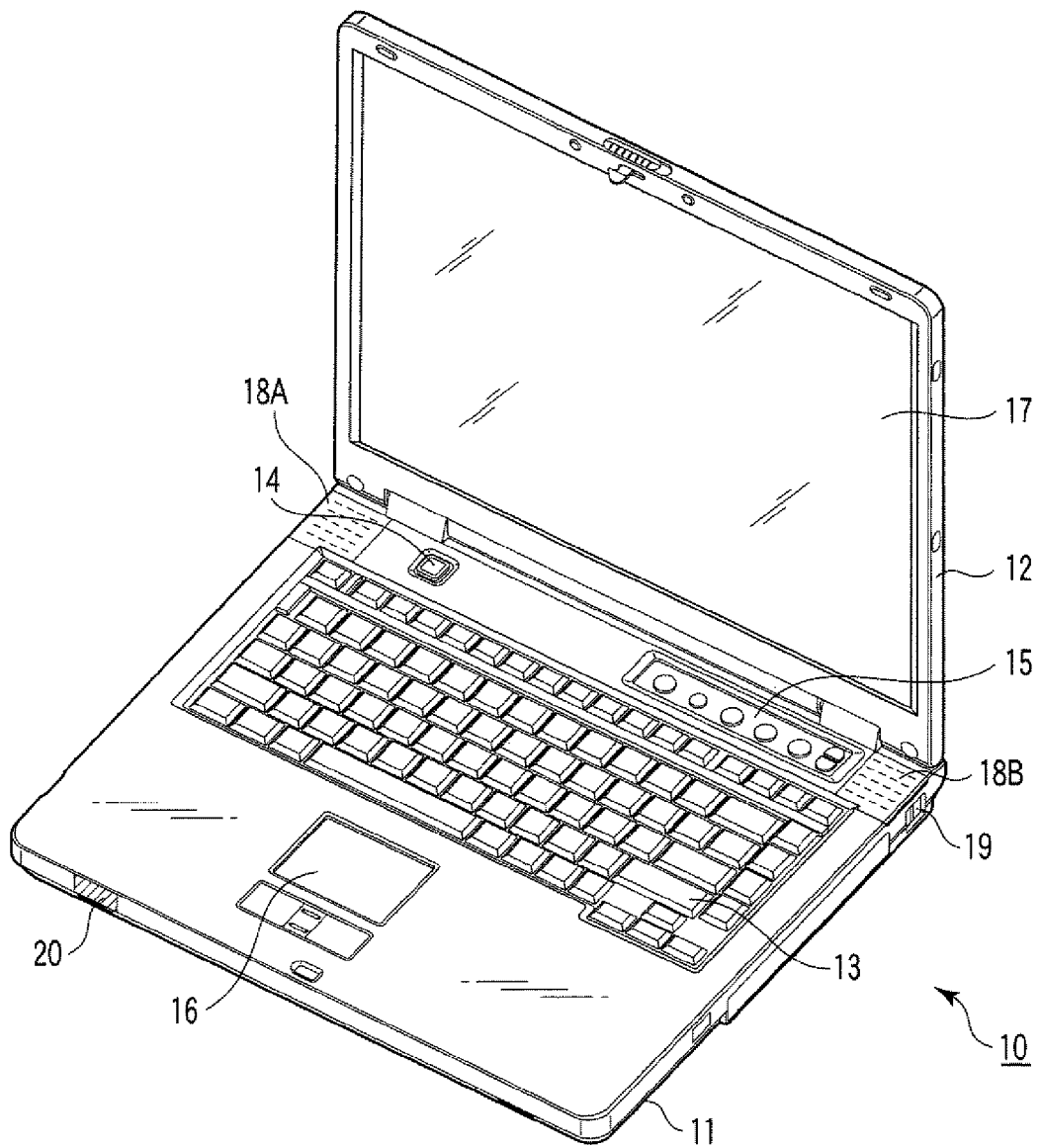
FIG. 1 is an exemplary perspective view showing the external appearance of an electronic apparatus according to an embodiment of the present invention.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data (also referred to as "audio-visual content data") such as broadcast program data and video data which is input from an external device. Specifically, the personal computer 10 has a television (TV) function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has a face image list display function for displaying, for instance, a list of face images of persons who appear in video content data, such as video data and broadcast program data, which is stored in the personal computer 10. This face image list display function is implemented, for example, as one of functions included in the TV function. The face image list display function is one of video indexing functions for presenting, for instance, outlines of video content data to a user. This face image list display function can present, to the user, which persons appear in which time zones in the whole video content data. In addition, the face image list display function can display a list of persons, with attention being paid to a predetermined attribute section included in the video content data.

FIG. 1 is a perspective view that shows the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening, recording, and playback of recorded broadcast program data/video data). In addition, a remote-control unit interface unit 20, which executes communication with a remote-control unit that controls the TV function of the computer 10, is provided on a front surface of the computer main body 11. The remote-control interface unit 20 is composed of, e.g. an infrared signal receiving unit.

An antenna terminal 19 for TV broadcast is provided, for example, on a right side surface of the computer main body 11. In addition, on a rear surface of the computer main body 11, there is provided an external display connection terminal corresponding to, e.g. the high-definition multimedia interface (HDMI) standard. The external display connection terminal is used to output video data (motion video data), which is included in video content data such as broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HDD) 111 into the main memory 103. The TV application program 202 is software for executing the TV function. The TV application program 202 executes, for example, a live playback process for viewing/listening to broadcast program data which is received by the TV tuner 117 and is currently broadcast, a recording process for recording received broadcast program data in the HDD 111, and a playback process for playing back broadcast program data/video data which is recorded in the HDD 111. The CPU 101 also executes a BIOS (Basic Input/Output System) that is stored in the BIOS-ROM 109. The BIOS is a program for hardware control.

The north bridge 102 is a bridge device that connects a local bus of the CPU 101 and the south bridge 104. The north bridge 102 includes a memory controller that access-controls the main memory 103. The north bridge 102 has a function of executing communication with the GPU 105 via, e.g. a PCI EXPRESS serial bus.

The GPU 105 is a display controller for controlling the LCD 17 that is used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-mentioned external display connection terminal. The HDMI terminal 2 can send both a non-compressed digital video signal and a digital audio signal via a single cable to the external display device 1 such as a TV. The HDMI control circuit 3 is an interface for sending the digital video signal to the external display device 1, which is called "HDMI monitor", via the HDMI terminal 2.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

Further, the video processor 113 is connected to the south bridge 104 via, e.g. a PCI EXPRESS serial bus.

The video processor 113 is a processor which executes various processes relating to the above-described video indexing. The video processor 113 functions, for example, as an indexing process module for executing a video indexing process. Specifically, in the video indexing process, the video processor 113 extracts a plurality of face images from the motion video data which is included in the video content data, and outputs, e.g. time stamp information indicating time points at which the extracted face images appear. The extraction of face images is executed, for example, by a face detection process for detecting a face region from each frame of the motion video data, and a cut-out process (trimming process) for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of many persons.

Further, the video processor 113 executes, for example, a process of detecting a commercial (CM) section which is included in video content data, and an audio indexing process. In usual cases, the time length of each CM section is set at one of some preset time lengths. In addition, a silent period of a predetermined time length is present before and after the CM section. Thus, in the CM section detection process, for example, audio data included in the video content data is analyzed, and a silent section of a predetermined time length is detected. A section (period), which is interposed between two successive detected silent sections and has a time length of a predetermined value or more, is detected as a CM section.

The audio indexing process is an indexing process of analyzing audio data which is included in video content data, and detecting a music section in which music is played and a talk section in which a talk is made, which are included in the video content data. In the audio indexing process, for example, the characteristics of the frequency spectrum of audio data are analyzed, and the music section and talk section are detected in accordance with the characteristics of the frequency spectrum. Since the characteristic of the frequency spectrum corresponding to the music section is different from the characteristic of the frequency spectrum corresponding to the talk section, the music section and talk section can be detected by analyzing the characteristics of the frequency spectrum. In addition, a section having a frequency spectrum, in which the characteristic of the frequency spectrum corresponding to the music section and the characteristic of the frequency spectrum corresponding to the talk section are mixed, can be detected as an overlap section in which the music section and the talk section overlap.

In the process of detecting the talk section, a speaker segmentation technique or a speaker clustering technique, for instance, is used. Thereby, a change of speakers is also detected. A period in which the same speaker (or the same speaker group) talks continuously becomes one talk section.

Furthermore, the audio indexing process executes a cheer level detection process of detecting a cheer level in each partial data (data of a fixed time length) in video content data, and an excitement level detection process of detecting an excitement level in each partial data in video content data.

The cheer level is indicative of a magnitude of cheer. Cheer is a sound in which voices of many people are combined. The sound in which voices of many people are combined has a distribution of a specific frequency spectrum. In the cheer level detection process, the frequency spectrum of audio data included in video content data is analyzed, and a cheer level of each partial data is detected in accordance with an analysis result of the frequency spectrum. The excitement level is a volume level of a section in which a volume level of a certain fixed level or more occurs continuously for a predetermined time length or more. For instance, a volume level of a sound, such as relatively great applause or loud laugh, is the excitement level. In the excitement level detection process, the distribution of the volume of audio data included in video content data is analyzed, and the excitement level of each partial data is detected in accordance with the analysis result.

The memory 113A is used as a working memory of the video processor 113. A great deal of arithmetic operations is required for executing the indexing process (the CM detection process, video indexing process and audio indexing process). In the present embodiment, the video processor 113, which is a dedicated processor and differs from the CPU 101, is used as a back-end processor, and the video processor 113 executes the indexing process. Therefore, the indexing process can be executed without increasing the load on the CPU 101. Since the CM detection process can be executed by analyzing audio data, as described above, the CM detection process is treated as one of processes of the audio indexing process in the description below.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground digital TV broadcast program data. The TV tuner 117 also has a function of capturing video data which is input from an external device.

Next, referring to FIG. 3, a description is given of a face image list display function which is executed by the TV application program 202.

The indexing process (video indexing process and audio indexing process) for video content data such as broadcast program data is executed by the video processor 113 that functions as the indexing process module, as described above.

Under the control of the TV application program 202, the video processor 113 executes the indexing process, for example, on video content data, such as recorded broadcast program data, which is designated by the user. In addition, the video processor 113 can execute, in parallel with the recording process for storing in the HDD 111 broadcast program data which is received by the TV tuner 117, the indexing process on this broadcast program data.

In the video indexing process (also referred to as "face image indexing process"), the video processor 113 analyzes, in units of a frame, motion video data that is included in video content data. The video processor 113 extracts face images of persons from a plurality of frames which constitute motion video data, and outputs time stamp information indicating time points at which the extracted face images appear in the video content data. As the time stamp information corresponding to each face image, use may be made of, for instance, an elapsed time from the start of video content data to the appearance of the face image, or the frame number of a frame from which the face image is extracted.

Further, the video processor 113 outputs a size (resolution) of each of the extracted face images. The face detection result data (face image, time stamp information TS, and size), which is output from the video processor 113, is stored in a database 111A as face image indexing data. The database 111A is a memory area which is provided in the HDD 111 for storing indexing data.

In the video indexing process, the video processor 113 further executes a thumbnail image acquisition process in parallel with the face image extraction process. A thumbnail image is an image (a reduced image) corresponding to each of a plurality of frames which are extracted, for example, at equal time intervals from the video content data. Specifically, the video processor 113 successively extracts frames, for example, at predetermined equal time intervals from the video content data, regardless of whether the frames include face images or not, and outputs images (thumbnail images) corresponding to the extracted frames and the time stamp information TS indicative of time points at which the thumbnail images appear. The thumbnail image acquisition result data (thumbnails, time stamp information TS), which is output from the video processor 113, is also stored in the database 111A as thumbnail indexing data.

In the audio indexing process, the video processor 113 analyzes audio data which is included in the video content data, detects a plurality of kinds of attribute sections (CM section, music section, and talk section) which are included in the video content data, and outputs section attribute information which defines the time points of the start and end of each detected attribute section. The section attribute information can be composed, for example, in association with each attribute section, from time information indicative of the start time point and end time point of each attribute section. Alternatively, the section attribute information may be composed of information indicative of the start time point of the attribute section and information indicative of the time length of the attribute section.

This section attribute information is stored in the database 111A as attribute detection result information. Further, in the audio indexing process, the video processor 113 executes the above-described cheer level detection process and the excitement level detection process. The result of the cheer level detection process and the result of the excitement level detection process are also stored in the database 111A as part of the above-described attribute detection result information.

As is shown in FIG. 4, the attribute detection result information (section attribute information) is composed of, for example, a CM section table, a music section table, a talk section table and a cheer/excitement level table.

The CM section table stores CM section attribute information which is indicative of a start time point and an end time point of a detected CM section. In a case where a plurality of CM sections are present in a sequence from a start position to an end position of video content data, the CM section attribute information corresponding to these plural CM sections is stored in the CM section table. The CM section table stores start time information and end time information, which are indicative of the start time point and end time point of each of the detected CM sections.

The music section table stores music section attribute information which is indicative of a start time point and an end time point of a detected music section. In a case where a plurality of music sections are present in a sequence from a start position to an end position of video content data, the music section attribute information corresponding to these plural music sections is stored in the music section table. The music section table stores start time information and end time information, which are indicative of the start time point and end time point of each of the detected music sections.

The talk section table stores talk section attribute information which is indicative of a start time point and an end time point of a detected talk section. In a case where a plurality of talk sections are present in a sequence from a start position to an end position of video content data, the talk section attribute information corresponding to these plural talk sections is stored in the talk section table. The talk section table stores start time information and end time information, which are indicative of the start time point and end time point of each of the detected talk sections.

The cheer/excitement level table stores a cheer level and an excitement level in each partial data of a predetermined time length (time segments T1, T2, T3, . . . ) in video content data.

As is shown in FIG. 3, the TV application program 202 includes a face image list display process module 301 for executing the face image list display function. The face image list display process module 301 is realized, for example, as an indexing viewer program, and displays an indexing view screen for displaying an outline of video content data, by using indexing information (e.g. face image indexing information, thumbnail indexing information, and section attribute information) stored in the database 111A.

Specifically, the face image list display process module 301 reads out the face image indexing information (face images, time stamp information TS, and size) from the database 111A, and displays, with use of the face image indexing information, a list of face images of persons, who appear in the video content data, on a two-dimensional display area (hereinafter referred to as "face thumbnail display area") on the indexing view screen. In this case, the face image list display process module 301 divides a total time length of video content data into a plurality of time zones, for example, at equal time intervals, and selects a predetermined number of face images appearing in each time zone from the extracted face images. The face image list display process module 301 arranges and displays the selected predetermined number of face images, in units of a time zone.

Specifically, the two-dimensional face thumbnail display area includes a plurality of face image display areas which are arranged in a matrix including a plurality of rows and a plurality of columns. A plurality of time zones, which constitute the total time length of the video content data, are allocated to the plurality columns, respectively. To be more specific, a plurality of time zones each having the same time length, which are obtained by dividing the total time length of the video content data at equal intervals by the number of these columns, are allocated to the plurality of columns, respectively. Needless to say, the time zone allocated to each column may not necessarily have the same time length.

On the basis of the time stamp information TS corresponding to each face image, the face image list display process module 301 displays face images, which belong to the time zone allocated to each column, on the same number of face image display areas as the number of rows belonging to each column, for example, by arranging the face images in the order of frequency of appearance of face images (in the order of detection time length of face images). In this case, for example, the same number of face images as the number of rows are selected, in the order of frequency of appearance, from the face images belonging to the time zone allocated to each column, and the selected face images are arranged from above to below in the order of frequency of appearance. Needless to say, the face images appearing in the time zone allocated to each column may be displayed, not in the order of frequency of appearance, but in the order of appearance of face images.

By this face image list display function, it becomes possible to easily understandably present, to the user, which persons appear in which time zones in the whole video content data. Specific structure examples of the face thumbnail display area will be described later with reference to FIG. 6 and the following Figures.

In addition, the face image list display process module 301 reads out the thumbnail indexing information (thumbnails, time stamp information TS) from the database 111A, and displays, with use of the thumbnail indexing information, the thumbnail images on a thumbnail display area (hereinafter referred to as "bellows thumbnail display area") which is disposed on one of an upper side and a lower side of the face thumbnail display area, by arranging the thumbnail images in line in the order of time of appearance.

Depending on video content data, there is a time zone in which no face image appears. Thus, by displaying the bellows thumbnail display area as well as the face thumbnail display area on the indexing view screen, it is possible to present to the user the content of video content data in the time zone in which no face image appears.

Further, the face image list display process module 301 reads out the section attribute information (CM section attribute information, music section attribute information, talk section attribute information) from the database 111A, and displays, on the basis of the section attribute information, a section bar, which includes bar areas indicative of positions (sections from start time points to end time points) of the attribute sections (CM section, music section, talk section) in the sequence from the start position to the end position of the video content data, on one of a lower side and an upper side of the face thumbnail display area on the indexing view screen. The section bar includes, for example, three sub-section bars, namely, a CM section bar indicative of the position of the CM section, a music section bar indicative of the position of the music section, and a talk section bar indicative of the position of the talk section.

In a case where there are a plurality of CM sections in the sequence, a plurality of bar areas indicative of the positions of the plural CM sections are displayed in the CM section bar. Similarly, in a case where there are a plurality of music sections in the sequence, a plurality of bar areas indicative of the positions of the plural music sections are displayed in the music section bar. In a case where there are a plurality of talk sections in the sequence, a plurality of bar areas indicative of the positions of the plural talk sections are displayed in the talk section bar. Hereinafter, each of the plural CM sections, which are dispersedly present in the sequence, is referred to as "partial CM section", each of the plural music sections, which are dispersedly present in the sequence, is referred to as "partial music section", and each of the plural talk sections, which are dispersedly present in the sequence, is referred to as "partial talk section", By displaying the section bar on the indexing view screen, it becomes possible to present, to the user, in which attribute section (CM section, music section, talk section) a person corresponding to each face image in the face thumbnail display area appears. Therefore, the user can find a data position in the entire video content data, from which playback is to be started, by considering the appearing persons and section attributes.

In addition, the face image list display process module 301 reads out the cheer level information and excitement level information from the database 111A, and displays, on the basis of the cheer level information and excitement level information, graphs which indicate a variation in cheer level and a variation in excitement level in the sequence from the start position to the end position of the video content data, on a level display area which is disposed on one of a lower side and an upper side of the face thumbnail display area on the indexing view screen.

By displaying this level display area, it becomes possible to present, to the user, in which part of the video content data a section in which loud cheer occurs is present, and in which part of the video content data a section in which great excitement occurs is present. The user can find a data position in the entire video content data, from which playback is to be started, by considering the appearing persons, section attributes, cheer level and excitement level.

By using the section attribute information (CM section attribute information, music section attribute information, talk section attribute information) and the time stamp information corresponding to a plurality of face images, the face image list display process module 301 can detect face images belonging to a specific attribute section (CM section, music section or talk section) from the face images included in the face indexing information. On the basis of the detection result, the face image list display process module 301 can switch the display state which is used for face image list display, for example, between a "specific attribute section face image display state" in which face images belonging to a specific attribute section are displayed, a "non-specific attribute section face image display state" in which face images belonging to sections other than the specific attribute section are displayed, and an "all face image display state" in which a face image list of all face images is displayed.

Specifically, the face image list display process module 301 has, in general terms, a first display mode and a second display mode. By selectively using the first display mode and the second display mode, the face image list display process module 301 displays a list of face images on the two-dimensional face thumbnail display area.

The first display mode is a display mode in which a list of face images in the entire video content data is displayed on the two-dimensional face thumbnail display area, regardless of the attribute sections such as the CM section, music section and talk section. In the first display mode, on the basis of the time stamp information corresponding to each of the plural face images included in the face indexing information, the same number of face images as the number of rows, which belong to the time zone allocated to each column, are selected in association with each column of the two-dimensional face thumbnail display area, and the selected face images are arranged and displayed on the face image display areas in the associated column.

The second display mode is a display mode in which a list of face images is displayed on the two-dimensional face thumbnail display area by paying attention to a certain specific attribute section which is selected from the CM section, music section and talk section. In the second display mode, on the basis of the time stamp information, which corresponds to each of the plural face images included in the face indexing information, and the section attribute information, the plural face images are classified into a first face image group which belongs to the certain specific attribute section, and a second face image group belonging to attribute sections other than the specific attribute section. The face images belonging to one of the first face image group and the second face image group are displayed on the two-dimensional face thumbnail display area in the state in which these face images are distinguished from the face images belonging to the other group. Specifically, the following display controls are usable.

(1) Only the face images belonging to one of the first face image group and the second face image group are displayed, and the face images belonging to the other group are not displayed.

(2) The face images belonging to one of the first face image group and the second face image group are displayed with emphasis, and the face images belonging to the other group are displayed with dimming.

(3) The face images belonging to one of the first face image group and the second face image group are preferentially displayed, and the face images belonging to the other group are displayed if there is room for display on the face thumbnail display area.

Accordingly, in the second display mode, for example, on the basis of the CM section attribute information, a plurality of face images are classified into a face image group belonging to the CM section in the video content data and a face image group belonging to a section (main section) other than the CM section in the video content data. In the case of where the TV broadcast program data includes main program data and the CM section inserted in the main program data, the main section corresponds to the main program data of the TV broadcast program data. The face images, which belong to one of the face image group belonging to the CM section and the face image group belonging to the main section, can be displayed in the state in which these face images are distinguished from the face images belonging to the other group. The user can designate which of the face image group belonging to the CM section and the face image group belonging to the main section is to be selected.

As has been described above, by using the CM section attribute information, the face images belonging to the CM section can be distinguished from the face images belonging to the section (main section) other than the CM section and can be displayed. Conversely, the face images belonging to the section (main section) other than the CM section can be distinguished from the face images belonging to the CM section and can be displayed. In this case, for example, the following display controls are usable.

(1) Only the face images belonging to the CM section are displayed, and the face images belonging to the section (main section) other than the CM section are not displayed. Conversely, only the face images belonging to the section (main section) other than the CM section are displayed, and the face images belonging to the CM section are not displayed.

(2) The face images belonging to the CM section are displayed with emphasis, and the face images belonging to the section (main section) other than the CM section are displayed with dimming. Conversely, the face images belonging to the section (main section) other than the CM section are displayed with emphasis, and the face images belonging to the CM section are displayed with dimming.

Similarly, for example, a plurality of face images may be classified into a face image group belonging to the music section and a face image group belonging to sections other than the music section. The face images belonging to one of the face image group belonging to the music section and the face image group belonging to the sections other than the music section can be distinguished from the face images belonging to the other group and can be displayed.

One of the first display mode and second display mode, which is to be used, may be selected by the user. In addition, the user can designate to which of the attributes of the CM section, music section and talk section the attention is to be paid in the second display mode. Specifically, the user can designate one of the attributes of the CM, music and talk, and can also select one of the "specific attribute section face image display state" and the "non-specific attribute section face image display state", which is to be used.

The above-described section bar can be used in the designation of the attribute by the user. The switching of the display state with use of the section bar is executed, for example, in the following manner.

(1) When a bar area on the section bar is selected by the user's operation of the mouse, keyboard or remote-control unit, the face image list display process module 301 switches the display mode, which is to be used, from the first display mode to the second display mode, and displays the list of face images by using, e.g. the "specific attribute section face image display state". In this case, for example, the face images belonging to the attribute section (CM section, music section or talk section), which corresponds to the bar area selected by the user, are detected by the face image list display process module 301 from the plural face images displayed in the first display mode, and these detected face images are distinguished from the other face images and are displayed.

(2) When the section bar of a certain attribute includes a plurality of bar areas corresponding to a plurality of partial sections (a plurality of partial CM sections, a plurality of partial music sections or a plurality of partial talk sections) and one of the plural bar areas is selected by the user, the face image list display process module 301 switches the display mode, which is to be used, from the first display mode to the second display mode, and displays the list of face images by using, e.g. the "specific attribute section face image display state". In this case, the face images belonging to the partial section which corresponds to the selected bar area, are distinguished from the other face images and are displayed. For example, when one of the plural partial CM sections is selected by the user, only the face images belonging to the selected partial CM section are detected, and the detected face images are displayed in the state in which these detected face images are distinguished from the face images belonging to the other partial CM sections and from the face images belonging to the attribute sections other than the CM section.

Not only the CM section, music section and talk section, but also the section (cheer section) having a cheer level of a predetermined value or more and the section (excitement section) having an excitement level of a predetermined value or more, for example, are usable as the attribute sections. In this case, the user can selectively designate the attribute, which corresponds to the CM section, music section, talk section, cheer section or excitement section, as the attribute to which attention is to be paid.

Next, referring to FIG. 5, the functional configuration of the TV application program 202 is described.

The TV application program 202 includes, in addition to the above-described face image list display process module 301, a recording process module 401, an indexing control module 402 and a playback process module 403.

The recording process module 401 executes a recording process for recording in the HDD 111 broadcast program data which is received by the TV tuner 117 or video data which is input from an external device. In addition, the recording process module 401 executes a programmed-recording process for receiving, with use of the tuner 117, broadcast program data which is designated by programmed-recording information (channel number, date/time) that is preset by the user, and recording the received broadcast program data in the HDD 111.

The indexing control module 402 controls the video processor (indexing process module) 113 and causes the video processor 113 to execute the indexing process (video indexing process, audio indexing process). The user can designate whether the indexing process is to be executed or not, in association with each broadcast program data that is to be recorded. For example, as regards broadcast program data to be recorded, for which execution of the indexing process has been instructed, the indexing process is automatically started after the broadcast program data is recorded in the HDD 111. Besides, the user may designate video content data, from among the video content data already stored in the HDD 111, for which the indexing process is to be executed.

The playback process module 403 executes a process for playing back each video content data stored in the HDD 111. In addition, the playback process module 403 has such a function that when a playback instruction event is input by a user operation in the state in which one of face images in the face image list of certain video content data is selected, the playback process module 403 starts playback of the video content data from a time point that is a predetermined time before a time point at which the selected face image appears.

By selectively designating the plural attribute sections, the user can determine the playback position of the video content data while viewing the face image list, with attention being paid to various attributes.

The indexing process may not necessarily be executed by the video processor 113. For example, the TV application program 202 may be provided with a function of executing the indexing process. In this case, the indexing process is executed by the CPU 101 under the control of the TV application program 202.

Next, referring to FIG. 6 to FIG. 11, structures of the indexing view screen are described.

FIG. 6 shows an example of an indexing view screen which is displayed on the LCD 17 by the face image list display process module 301. The indexing view screen is a screen which is obtained by subjecting certain video content data (e.g. broadcast program data) to the indexing process. The indexing view screen includes the above-described face thumbnail display area for displaying the list of face images, the above-described level display area, the above-described section bar, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes. In FIG. 6, a thumbnail image, which has a greater distance from a selected thumbnail image, is more reduced in its lateral size.

The level display area displays a graph (a graph shown in a dense color in FIG. 6) indicating a variation of the cheer level, and a graph (a graph shown in a light color in FIG. 6) indicating a variation of the excitement level.

The section bar includes a talk section bar, a music section bar and a CM section bar. In the CM section bar, a bar area (a black strip area in FIG. 6) is displayed at a position of each CM section (each partial CM section). In the music section bar, a bar area (a cross-hatched strip area in FIG. 6) is displayed at a position of each music section (each partial music section). In the talk section bar, a bar area (a hatched strip area in FIG. 6) is displayed at a position of each talk section (each partial talk section). The user can select any one of the talk section bar, music section bar and CM section bar by operating a button of the remote-control key, or an upward, downward, leftward or rightward cursor key of the keyboard 13. In addition, the user can also select a bar area in the selected section bar by operating the button of the remote-control key, or the upward, downward, leftward or rightward cursor key of the keyboard 13.

Figure 7:
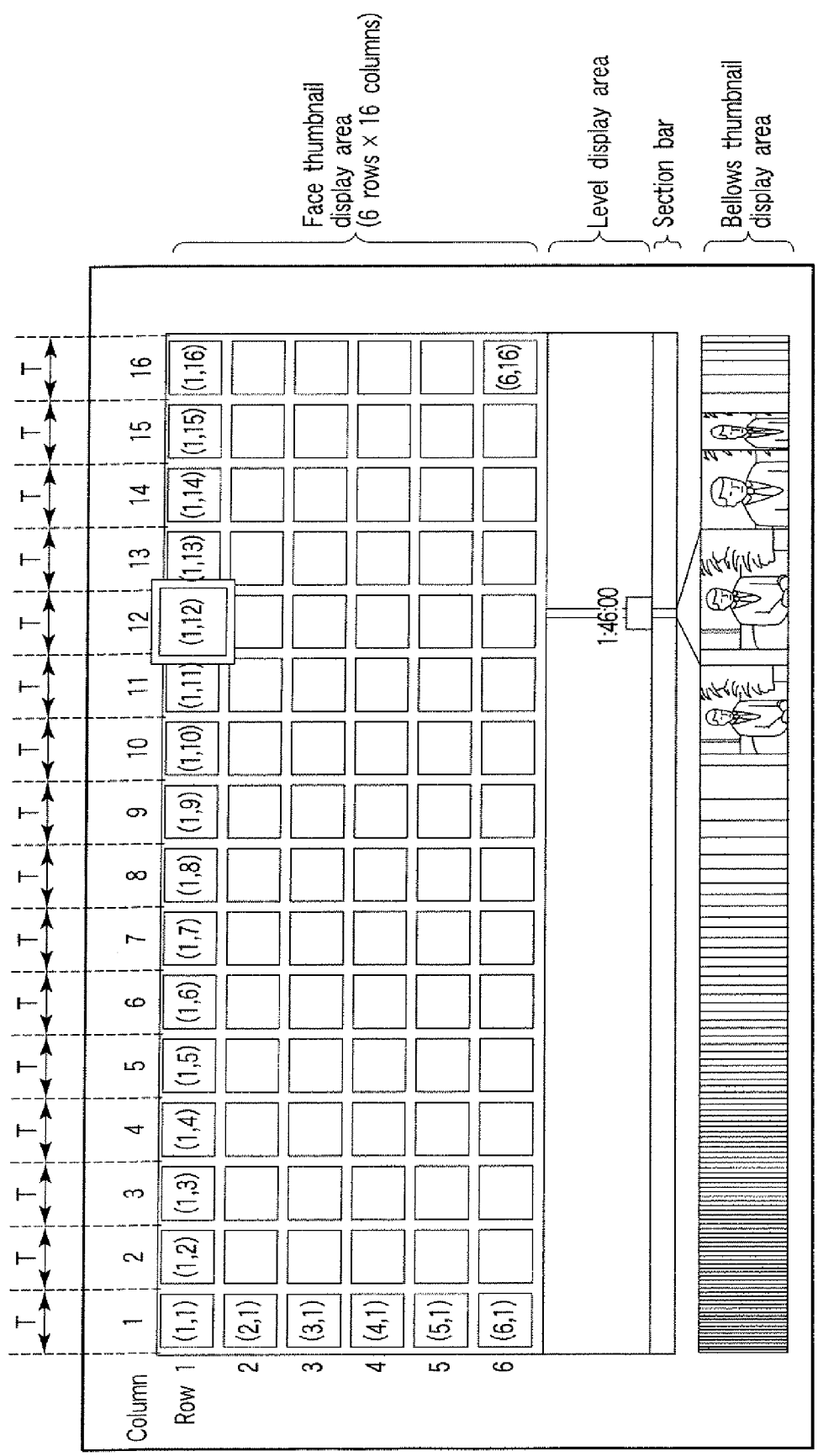
FIG. 7 shows a structure example of a face thumbnail display area which is included in the indexing view screen shown in FIG. 6.

FIG. 7 shows an example of the structure of the face thumbnail display area.

The face thumbnail display area includes a plurality of face image display areas which are arranged in a matrix including a plurality of rows and a plurality of columns. In FIG. 7, the face thumbnail display area comprises 6 rows×16 columns. The number of face image display areas included in the face thumbnail display area is 96.

A plurality of time zones, each of which has the same time length T that is obtained by dividing the total time length of video content data by the number of columns (16) at equal time intervals, are allocated to columns 1 to 16, respectively.

For example, if the total time length of video content data is two hours, the two hours are divided into 16 time zones at equal time intervals. In this case, the time length T of each time zone is 7.5 minutes. For example, a time zone from 0:00:00 (the beginning) to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

Needless to say, the length of the time zone, which is allocated to each of the plural columns, may not necessarily be equal.

In the first display mode, on the basis of time stamp information corresponding to face images which are extracted by the video processor 113, the face image list display process module 301 displays the face images, which belong to the time zone allocated to each column, on the six face image display areas of the associated column by arranging the face images, for example, in the above-described order of frequency. In this case, the face image list display process module 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, use is made of a time axis having a base point at a left end position (1, 1) and an end point of video content data at a right end position (6, 16).

The user can select the size of the face image, which is displayed on each face image display area of the face thumbnail display area, from among "large", "medium" and "small". The number of rows and the number of columns are varied in accordance with the size of the face image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non-selected "standard" state and a selected "focus" state. The size of the face image in the "focus" state is set to be greater than the size (180×180, 90×90, or 60×60) of the face image in the "standard" state. FIG. 7 shows the case in which the face image at coordinates (1, 12) is in the "focus" state.

The number of thumbnail images, which are displayed in the bellows thumbnail display area, is set at one of 240, 144, 96 and 48 in accordance with the user setting. The default value is, e.g. 240.

The thumbnail image is set in one of two states, namely, a non-selected "standard" state and a selected "focus" state. The size of the thumbnail image in the "focus" state is set to be greater than the size of the other thumbnail images.

Figure 8:
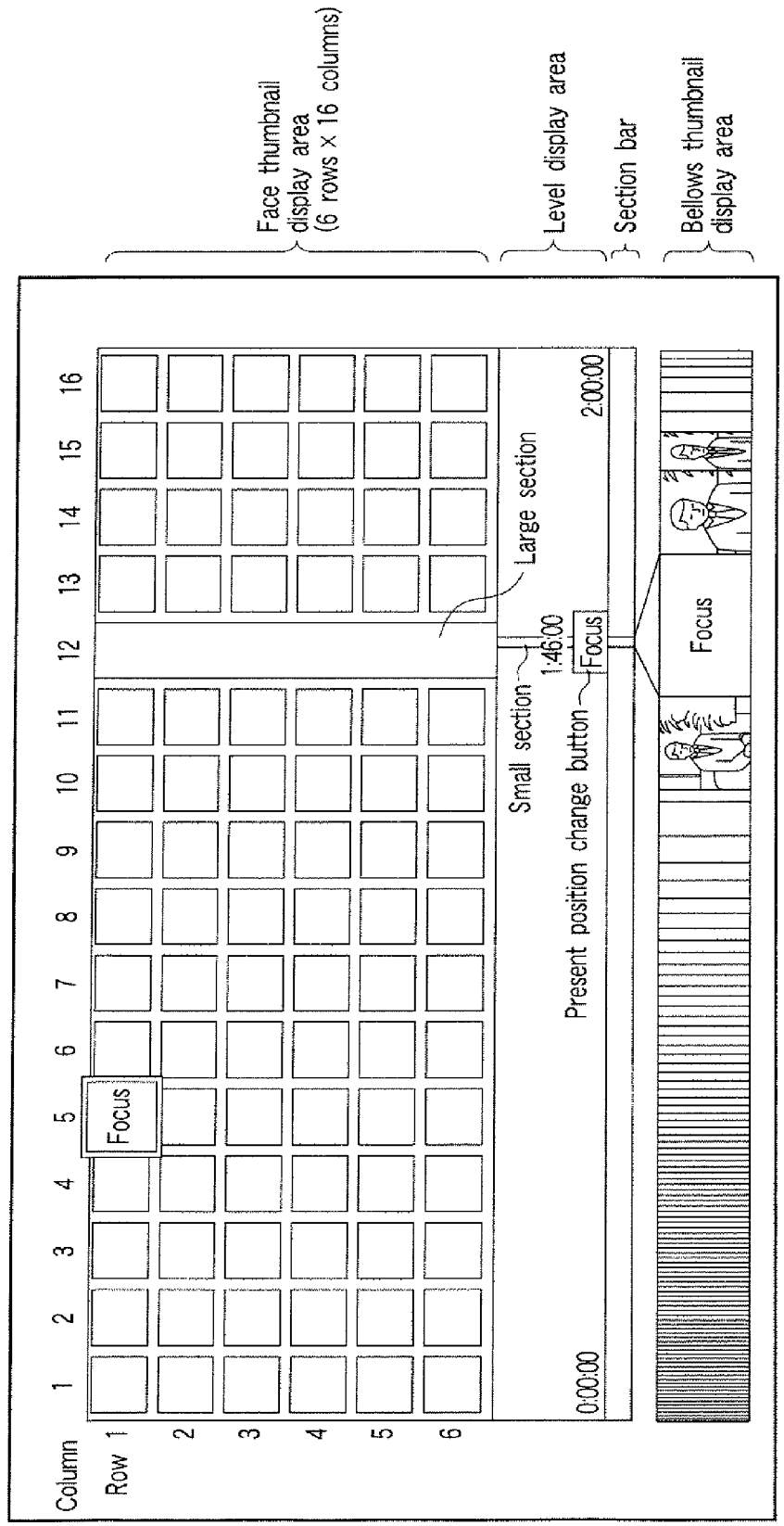
FIG. 8 is a view for explaining the relationship between the face thumbnail display area and a bellows thumbnail display area, which are included in the indexing view screen shown in FIG. 6.

Next, referring to FIG. 8, the relationship between the face thumbnail display area and the bellows thumbnail display area is described.

A set of face image display areas belonging to the same column, that is, each column in the face thumbnail display area, is referred to as "large section". Each of divisions of the "large section" is referred to as "small section". The number of small sections included in one large section is given by a quotient of the number of thumbnail images displayed in the bellows thumbnail display area, which are divided by the number of columns of the face thumbnail display area. For example, if the face thumbnail display area has a size of 6 rows×16 columns and the number of thumbnail images displayed in the bellows thumbnail display area is 240, the number of small sections included in one large section is 15 (equals 240 divided by 16). One large section includes 15 small sections. In other words, 15 thumbnail images belong to the time zone corresponding to one large section.

When a certain thumbnail image on the bellows thumbnail display area is selected, the face image list display process module 301 selects, on the basis of time stamp information of the selected thumbnail image, a column (large section) from plural columns (plural large sections) in the face thumbnail display area, to which the time zone to which the selected thumbnail image belongs is allocated. The selected large section is a large section which includes the selected thumbnail image as a small section. The face image list display process module 301 displays with emphasis the selected large section.

Further, the face image list display process module 301 displays a vertical bar which connects the selected thumbnail image and the selected large section. The vertical bar is used in order to indicate to which of the 15 small sections, which are included in the selected large section, the small section corresponding to the selected thumbnail image corresponds. The vertical bar is displayed at the position of that small section of the 15 small sections included in the selected large section, which corresponds to the selected thumbnail image. For example, if the selected thumbnail image is the first image of the 15 thumbnail images belonging to the time zone corresponding to a certain large section, that is, the image corresponding to the first small section of the large section, the selected thumbnail image is connected to the left end of the large section by the vertical bar. On the other hand, for example, if the selected thumbnail image is the last image of the 15 thumbnail images belonging to the time zone corresponding to a certain large section, that is, the image corresponding to the last small section of the large section, the selected thumbnail image is connected to the right end of the large section by the vertical bar.

As has been described above, when a thumbnail image on the bellows thumbnail display area is selected, a column (large section), to which the time zone to which the selected thumbnail image belongs is allocated, is automatically selected from a plurality of columns in the face thumbnail display area. Thereby, the user can recognize to which of columns (large sections) in the face thumbnail display area the selected thumbnail image corresponds. Further, by the vertical bar, the user can also recognize to which time point in which column (large section) the selected thumbnail image corresponds.

Furthermore, the face image list display process module 301 displays, on the basis of the time stamp information of the selected thumbnail image, the time information on the indexing view screen, which indicates the time point at which the selected thumbnail image appears.

A "present position change" button is an operation button for changing a thumbnail image which is selected. If the user operates a left cursor key or a right cursor key in the state in which the "present position change" button is focused, the thumbnail image to be selected is shifted to the left or right, for example, in units of one small section.

Figure 9:
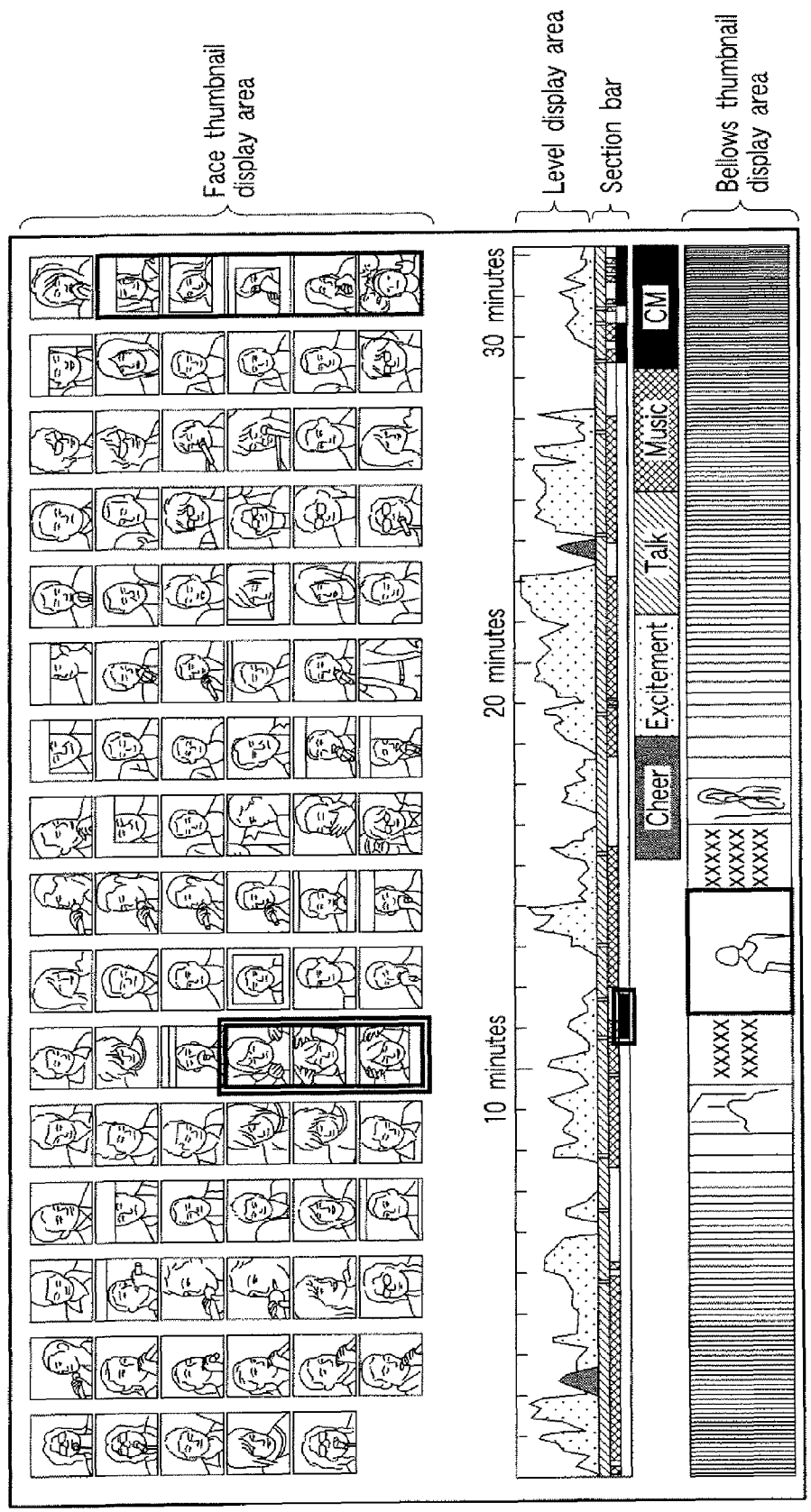
FIG. 9 shows a state in which a list of face images, which belong to a specific attribute section, is displayed on the face thumbnail display area which is included in the indexing view screen shown in FIG. 6.

FIG. 9 shows an example of face image list display corresponding to the case in which one bar area in the CM section bar is selected.

For example, if one bar area in the CM section bar is selected by the user in the state in which the face list display is executed in the first display mode, the display mode for the face image list display is switched from the first display mode to the second display mode. In FIG. 9, the selected bar area is displayed in the state in which the selected bar area is enclosed in a box.

In this case, for example, the face images belonging to the CM section (selected CM section) corresponding to the selected bar area and the face images belonging to the other CM sections are detected from the plural face images which are displayed in the face thumbnail display area in the first display mode. The face images belonging to the selected CM section are displayed, for example, in the state in which these face images are encircled in a double-line box. The face images belonging to the other CM sections are displayed in the state in which these face images are encircled in a single-line box. The method of display is not limited to these examples. For example, the face images encircled in the box may be displayed with emphasis (e.g. enlargement, brightening), the other face images may be displayed with dimming (e.g. reduction in size, darkening, lightening), a mark may be displayed at a corner of the face image, or only the face images enclosed in a box may be displayed while the other face images being excluded from display.

When a part other than the bar area in the CM section bar is selected by the user, the face images belonging to the section (main section) other than the CM sections are detected, these face images belonging to the section (main section) other than the CM sections may be displayed with emphasis, the face images belonging to the CM sections may be displayed with dimming, or only the face images belonging to the main section may be displayed while the other face images belonging to the CM sections being excluded from display.

As described above, the user can select the display mode that is to be used, and designate the attribute section of interest, by selecting the bar area in the CM section bar or by selecting a part other than the bar area. Thereby, paying attention to only the CM section in the entire video content data or only the main section in the entire video content data, the user can look down upon the list of the face images of appearing persons.

In the case where a bar area in the CM section bar is selected by the user in the state in which the face image list display is executed in the second display mode with attention being paid to the music section or talk section, the attribute to which attention is paid is switched from the music section or talk section to the CM section, and the face image list display is executed with attention being paid to the CM section.

Figure 10:
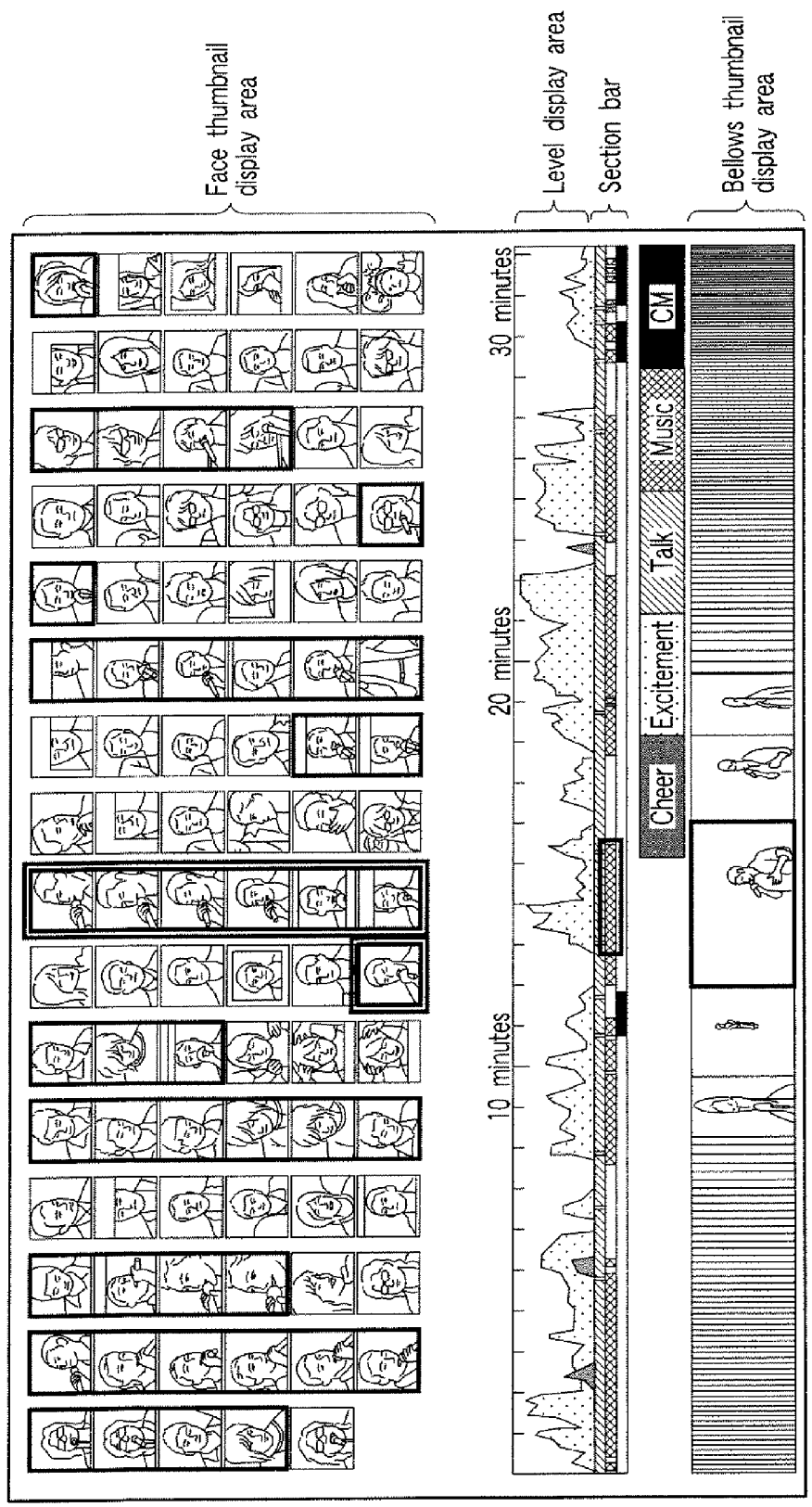
FIG. 10 shows a state in which a list of face images, which belong to another specific attribute section, is displayed on the face thumbnail display area which is included in the indexing view screen shown in FIG. 6.

FIG. 10 shows an example of face image list display corresponding to the case in which one bar area in the music section bar is selected.

For example, if one bar area in the music section bar is selected by the user in the state in which the face list display is executed in the first display mode, the display mode for the face image list display is switched from the first display mode to the second display mode. In FIG. 10, the selected bar area is displayed in the state in which the selected bar area is enclosed in a box.

In this case, the face images belonging to the music section (selected music section) corresponding to the selected bar area and the face images belonging to the other music sections are detected from the plural face images which are displayed in the face thumbnail display area in the first display mode. The face images belonging to the selected music section are displayed, for example, in the state in which these face images are encircled in a double-line box. The face images belonging to the other music sections are displayed in the state in which these face images are encircled in a single-line box. The method of display is not limited to these examples. For example, the face images encircled in the box may be displayed with emphasis (e.g. enlargement, brightening), the other face images may be displayed with dimming (e.g. reduction in size, darkening, lightening), or only the face images enclosed in a box may be displayed while the other face images being excluded from display.

As described above, by selecting the bar area in the music section bar, the user can confirm the face images of appearing persons, with attention being paid to only the music section in the entire video content data. In the case where a bar area in the music section bar is selected by the user in the state in which the face image list display is executed in the second display mode with attention being paid to the CM section or talk section, the attribute to which attention is paid is switched from the CM section or talk section to the music section, and the face image list display is executed with attention being paid to the music section.

Figure 11:
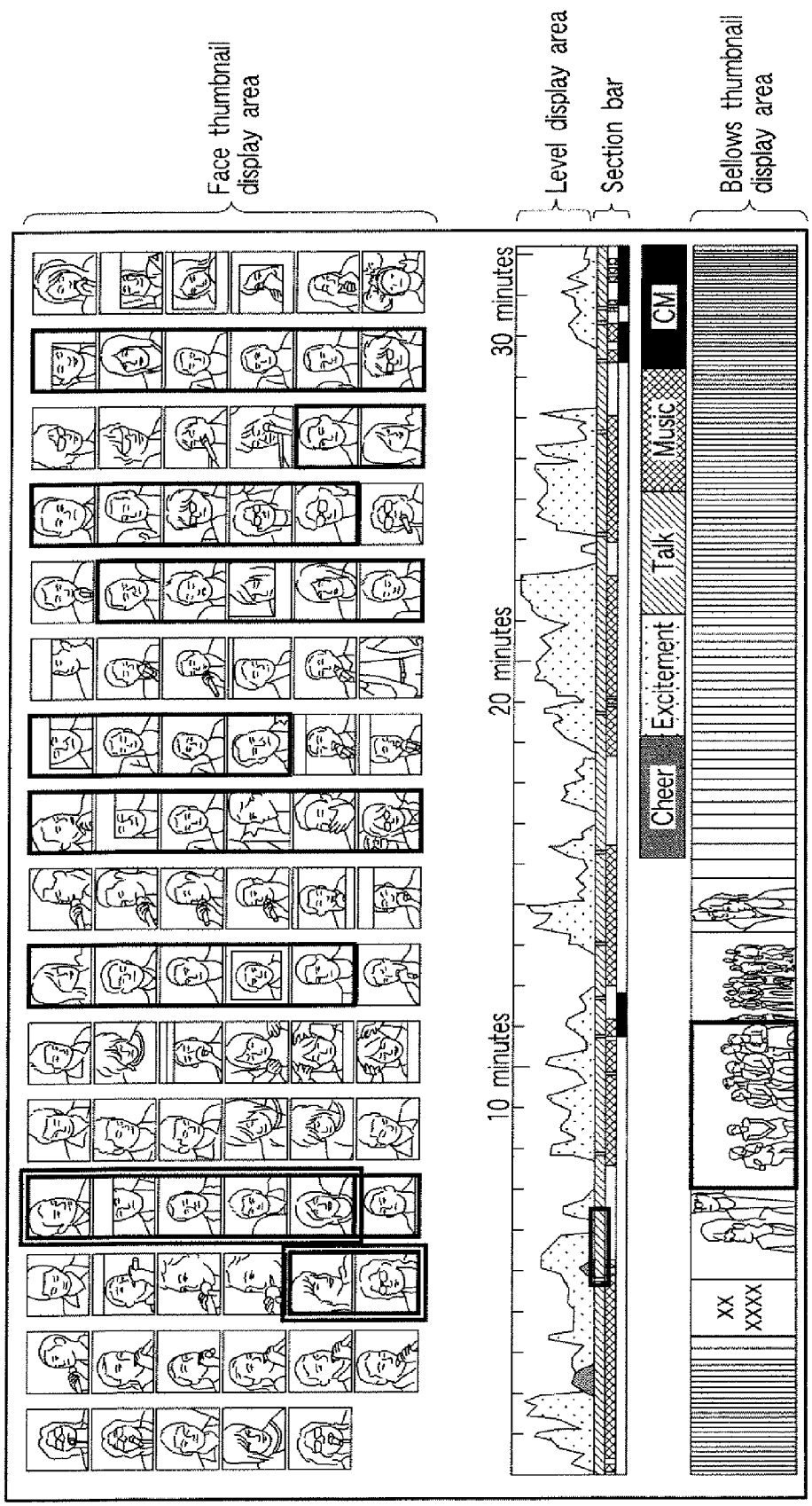
FIG. 11 shows a state in which a list of face images, which belong to still another specific attribute section, is displayed on the face thumbnail display area which is included in the indexing view screen shown in FIG. 6.

FIG. 11 shows an example of face image list display corresponding to the case in which one bar area in the talk section bar is selected.

For example, if one bar area in the talk section bar is selected by the user in the state in which the face list display is executed in the first display mode, the display mode for the face image list display is switched from the first display mode to the second display mode. In FIG. 11, the selected bar area is displayed in the state in which the selected bar area is enclosed in a box.

In this case, the face images belonging to the talk section (selected talk section) corresponding to the selected bar area and the face images belonging to the other talk sections are detected from the plural face images which are displayed in the face thumbnail display area in the first display mode. The face images belonging to the selected talk section are displayed, for example, in the state in which these face images are encircled in a double-line box. The face images belonging to the other talk sections are displayed in the state in which these face images are encircled in a single-line box. The method of display is not limited to these examples. For example, the face images encircled in the box may be displayed with emphasis (e.g. enlargement, brightening), the other face images may be displayed with dimming (e.g. reduction in size, darkening, lightening), or only the face images enclosed in a box may be displayed while the other face images being excluded from display.

As described above, by selecting the bar area in the talk section bar, the user can confirm the face images of appearing persons, with attention being paid to only the talk section in the entire video content data. In the case where a bar area in the talk section bar is selected by the user in the state in which the face image list display is executed in the second display mode with attention being paid to the CM section or music section, the attribute to which attention is paid is switched from the CM section or music section to the talk section, and the face image list display is executed with attention being paid to the talk section.

Figure 12:
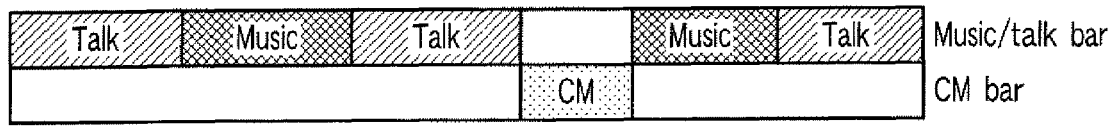
FIG. 12 shows a structure example of a section bar which is disposed in the indexing view screen shown in FIG. 6.

FIG. 12 shows another structure example of the section bar.

In FIG. 12, the section bar comprises two sub-section bars, namely, a music/talk section bar and a CM section bar. The CM section bar indicates the position of a CM section. The music/talk section bar indicates the position of a music section and the position of a talk section in the section (main section) other than the CM section. In the case where the CM section bar is selected by the user, the face images belonging to the CM section are detected, and the detected face images are distinguished from the face images in the main section and are displayed. In the case where the music/talk section bar is selected by the user, the face images belonging to the main section are detected, and the detected face images are distinguished from the face images in the CM section and are displayed. In the case where a talk bar area in the music/talk section bar is selected by the user, the face images belonging to the talk section corresponding to the selected talk bar area are detected, and the detected face images are distinguished from the other face images and are displayed. Furthermore, in the case where a music bar area in the music/talk section bar is selected by the user, the face images belonging to the music section corresponding to the selected music bar area are detected, and the detected face images are distinguished from the other face images and are displayed.

Figure 13:
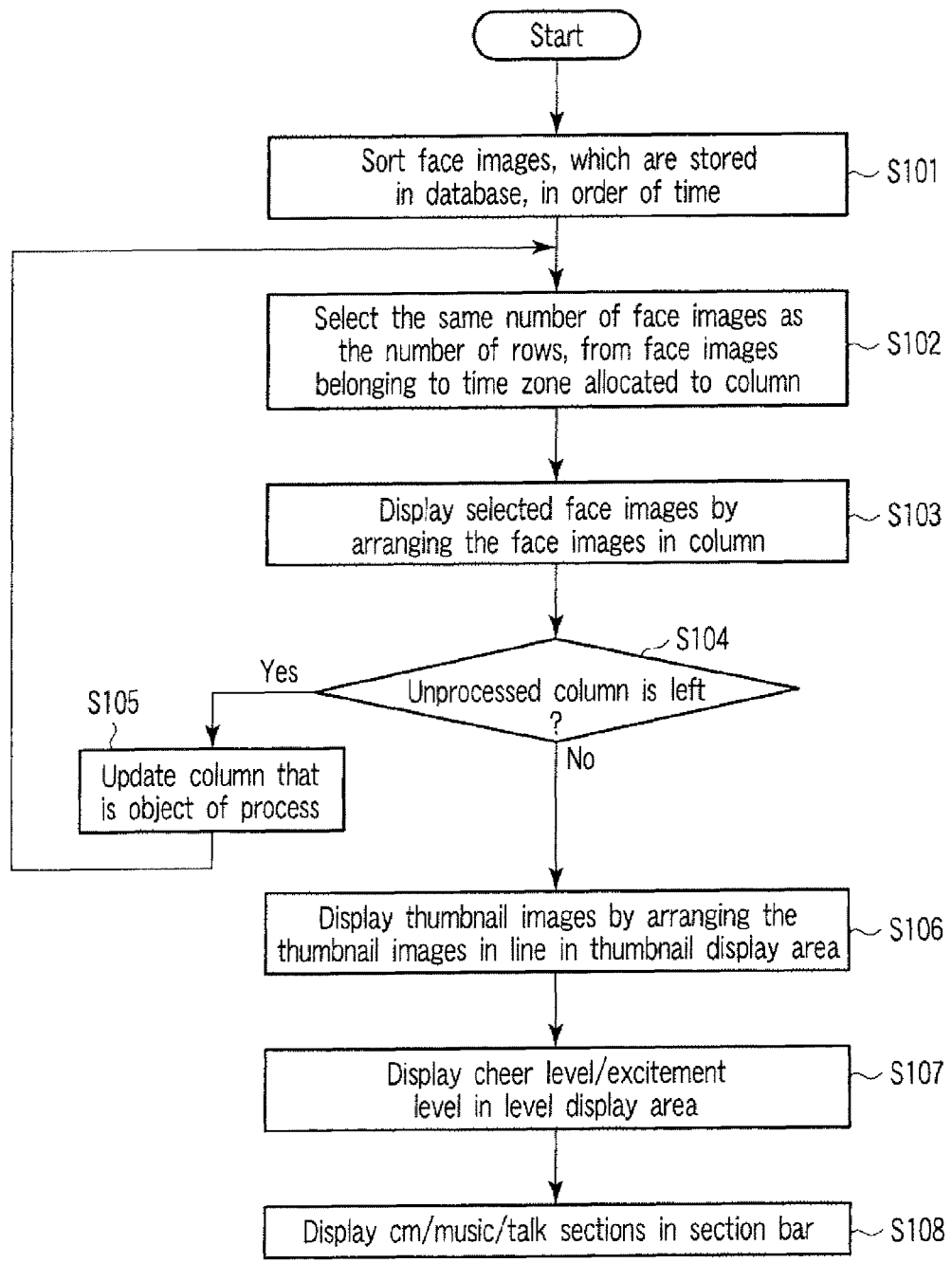
FIG. 13 is an exemplary flow chart illustrating an example of the procedure of a face image list display process which is executed by the electronic apparatus according to the embodiment.

Next, referring to a flow chart of FIG. 13, a description is given of the procedure of the display process which is executed by the face image list display process module 301.

To start with, the face image list display process module 301 sorts face images stored in the database 111A, on the basis of time stamp information corresponding to these face images, in an order of time of appearance of the face images (step S101). Then, the face image list display process module 301 determines the number of rows and the number of columns in accordance with a face image size to be displayed, which is designated by the user, and calculates a time zone which is allocated to each column (large section), by equally dividing the total time length of video content data, which is an object of indexing, by the number of columns. Then, the face image list display process module 301 selects that number of face images, which is equal to the number of rows, from the face images belonging to the time zone which is allocated to the column that is the object of the display process (step S102). If the number of face images belonging to the time zone, which is allocated to the column that is the object of the display process, is larger than the number of rows, the face image list display process module 301 may execute a process of preferentially selecting, for example, face images with high frequency of appearance.

Figure 14:
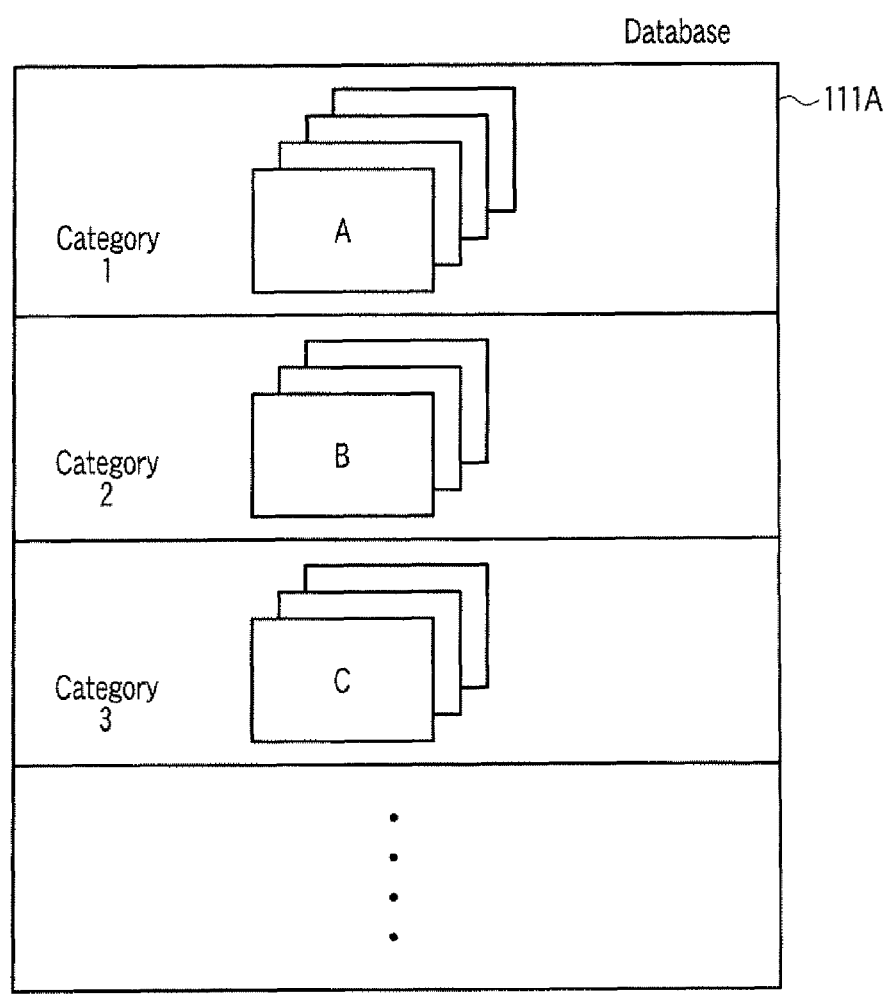
FIG. 14 shows a state in which face images are classified into categories by the electronic apparatus according to the embodiment.

In this case, the face image list display process module 301 preferentially selects, from the face images belonging to a time zone allocated to the column that is the object of the display process, face images with high frequency of appearance in this time zone. For example, the video processor 113 may execute a clustering process of classifying face images of the same person into the same category, on the basis of the correlation between characteristic data of extracted face images. In this case, as shown in FIG. 14, the face images are classified on a person-by-person basis (i.e. on a category-by-category basis), and stored in the database 111A. In FIG. 14, category 1 represents a set of face images of a person A, category 2 represents a set of face images of a person B, and category 3 represents a set of face images of a person C. The face image list display process module 301 preferentially selects the face images of a person with high frequency of appearance. In a time zone in which only the face images of the same person are continuously displayed for a relatively long time, it is possible to display a plurality of different face images of the same person on the column corresponding to this time zone.

In the case where the number of face images belonging to the time zone, which is allocated to the column that is the object of the display process, is larger than the number of rows, the face image list display process module 301 may preferentially select face images with large sizes, from the face images belonging to the time zone allocated to the column that is the object of the display process, on the basis of size information of each face image which is stored in the database 111A.

The size of a face image, which is extracted from a frame showing a close-up face, is relatively large. Accordingly, as the size of the extracted face image is larger, it is highly possible that the person of the extracted face image is of higher importance. By preferentially selecting a face image with a larger size, it becomes possible to preferentially display a face image of a person who is of high importance.

Subsequently, the face image list display process module 301 displays selected face images on a plurality of face image display areas in the column that is the object of the display process, for example, by arranging the face images in the order of frequency of appearance (step S103). A face image with a higher frequency of appearance is displayed on a more upward face image display area.

The process of steps S102 and S103 is repeatedly executed until the processing on all columns is completed, while the column that is the object of the display process is updated (step S104, S105). As a result, plural image images are displayed in the face image display areas in the first mode.

If the number of face images belonging to the time zone, which is allocated to the column that is the object of the display process, is less than the number of rows, thumbnail images belonging to the corresponding time zone may also be displayed in the column that is the object of the display process.

If the process on all columns is completed (NO in step S104), the face image list display process module 301 displays the thumbnail images, which are stored in the database 111A, on the bellows thumbnail display area on the basis of the time stamp information of the thumbnail images, by arranging the thumbnail images in line in the order of time of appearance of the thumbnail images (step S106).

Thereafter, the face image list display process module 301 reads out the cheer level information and excitement level information from the database 111A, and displays, on the level display area, a graph which indicates a variation in cheer level in the sequence from the start position to the end position of the video content data, and a graph which indicates a variation in excitement level in the sequence, in accordance with the cheer level information and excitement level information (step S107).

Subsequently, the face image list display process module 301 reads out the CM section attribute information, music section attribute information and talk section attribute information from the database 111A, and displays the CM section bar, music section bar and talk section bar on the basis of the CM section attribute information, music section attribute information and talk section attribute information (step S108). The CM section bar displays the bar area which is indicative of the position of the CM section. Similarly, the music section bar displays the bar area which is indicative of the position of the music section, and the talk section bar displays the bar area which is indicative of the position of the talk section.

Figure 15:
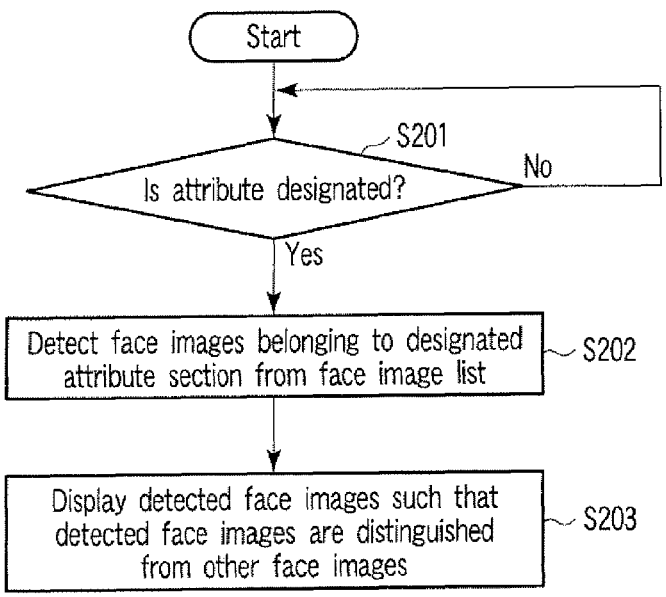
FIG. 15 is an exemplary flow chart illustrating an example of the procedure of a process of displaying a face image list, with attention being paid to a specific attribute section, which is executed by the electronic apparatus according to the embodiment.

Next, referring to a flow chart of FIG. 15, a description is given of the procedure of a process of displaying a face image list belonging to a specific attribute section.

If a certain attribute (attribute section) is designated by the user (step S201), the face image list display process module 301 detects the face images belonging to the designated attribute section, from a plurality of face images, on the basis of the section attribute information corresponding to the designated attribute section and the time stamp information of the plural face images in the face image indexing information (step S202).

In step S202, the face image list display process module 301 reads out, from the database 111A, the section attribute information (CM section attribute information, music section attribute information or talk section attribute information) corresponding to the designated attribute section (CM section, music section or talk section), and specifies the start time point and end time point of the designated attribute section. Then, the face image list display process module 301 detects, from the plural face images, the face images belonging to the time zone from the start time point to the end time point of the designated attribute section. In other words, the plural face images are classified into the group of face images belonging to the designated attribute section and the group of face images belonging to the sections other than the designated attribute section. The user can execute the designation of the attribute section by using the section bar, as described above. Needless to say, the user can use a menu screen for prompting the user to designate the attribute section (CM section, music section, talk section), or can designate one of the CM section, music section and talk section by operating the button of the remote-control unit.

Then, the face image list display process module 301 executes a process of displaying the detected face images in the state in which the detected face images are distinguished from the other face images (step S203). In step S203, as has been described above, the following process can be executed: (1) the process of displaying the detected face images with emphasis and displaying the other face images with dimming, (2) the process of displaying only the detected face images and excluding the other face images from objects of display, (3) the process of displaying the other face images with emphasis and displaying the detected face images with dimming, or (4) the process of displaying only the other face images and excluding the detected face images from objects of display.

Figure 16:
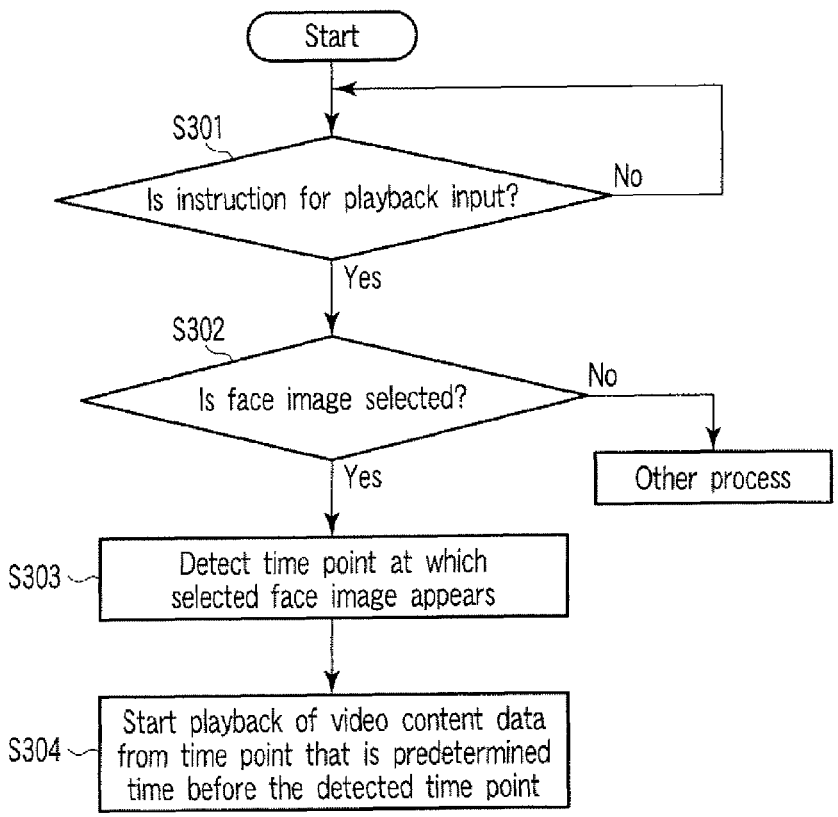
FIG. 16 is an exemplary flow chart illustrating an example of the procedure of a playback process which is executed by the electronic apparatus according to the embodiment.

Next, referring to a flow chart of FIG. 16, a description is given of the procedure of a playback process which is executed by the playback process module 403.

When an event of instructing playback of video content data is input in accordance with a user operation (YES in step S301), the playback process module 403 cooperates with the face image list display process module 301 and determines whether a certain face image on the face thumbnail display area is selected or not (step S302). If there is a face image which is selected (YES in step S302), the playback process module 403 detects a time point at which the selected face image appears, on the basis of the time stamp information of the selected face image (step S303). The playback process module 403 starts playback of the video content data from a time point which is a predetermined time before the detected time point, for example, from a time point which is two seconds before (step S304).

When an invent of instructing playback of video content data is input in the state in which a certain thumbnail image on the bellows thumbnail display area is selected, the playback process module 403 starts, on the basis of the time stamp information of the selected thumbnail image, playback of the video content data from a time point which is a predetermined time before the detected time point at which the selected thumbnail image appears, for example, from a time point which is two seconds before.

As has been described above, in the present embodiment, a list of appearing persons can be presented to the user, with attention being paid not to the entire video content data but to a specific attribute section in the vide content data. Thus, the user can look down upon an outline of the video content data, for example, by paying attention to the CM section in the video content data or to the section (main section) other than the CM section. In addition, the user can look down upon an outline of the video content data by paying attention to other attribute sections (music, talk, cheer, excitement, main section, etc.).

In the present embodiment, selective use can be made of the first display mode of displaying a list of face images in the entire video content data, and the second display mode of displaying a list of face images with attention being paid only to a specific attribute section in the entire video content data. Thus, without playing back the video content data, it is possible to present, to the user, which person appears in which time zone of video content data, and to present, to the user, a list of appearing persons with attention paid to the specific attribute section.

In the present embodiment, the indexing information (face image indexing information, section attribute information, etc.) is generated by the video processor 113 which functions as the indexing process module. However, for example, in the case where broadcast program data includes, in advance, indexing information corresponding to the broadcast program data, this indexing information can be utilized. If there is complete indexing information that is necessary, there is no need to execute the indexing process. Accordingly, the face image list display function of the present embodiment can also be realized by only the database 111A and face image list display process module 301.

In the present embodiment, the case of using a plurality of kinds of attribute sections has been exemplified. Alternatively, the embodiment may adopt such a structure that only one specific attribute section, such as a CM section, is used.

In the present embodiment, a normal face list is displayed in the first display mode, and a face list, which can be distinguished with attention paid to the selected attribute, is displayed in the second display mode. Alternatively, for example, the embodiment may adopt such a structure that a face list of the group of face images belonging to the selected attribute section is displayed in the second display mode, and a face list of the group of face images belonging to sections other than the selected attribute section is displayed in the first display mode.

In the face thumbnail display area of the present embodiment, use is made of the time axis having the base point at the left end position and the end point of video content data at the right end position. Alternatively, for example, the base point may be set at the left end position and the end point may be set at the right end position with respect to a part of the video content data. In addition, the left and the right may be reversed. Besides, the arrangement in the up-and-down direction and in the left-and-right direction may be reversed.

In the present embodiment, a description has been given of the example in which the time information indicative of the start time point and the time information indicative of the end time point are used as the section attribute information. However, it should suffice if the section attribute information is information which specifies the start and end time points of each section. Thus, the information indicative of the start point of the section and the information indicative of the time length of the section may be used as the section attribute information.

The procedure of the face image list display process of the present embodiment can all be realized by software. Therefore, by installing the software in an ordinary computer via a computer-readable memory medium, the same advantageous effects as in the present embodiment can easily be realized.

The electronic apparatus of the present embodiment can be realized by not only the computer 10, but also by various consumer electronic apparatuses such as an HDD recorder, a DVD recorder and a TV apparatus. In this case, the functions of the TV application program 202 can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a storage device to store face image indexing information including a plurality of face images extracted from video content data, and section attribute information which specifies a start time point and an end time point of at least one predetermined attribute section of a plurality of attribute sections in the video content data; and
   a face image list display process module configured to classify the plurality of face images into a first face image group belonging to the predetermined attribute section and a second face image group belonging to the sections other than the predetermined attribute section, and to display, on a display area, the face images belonging to one group of the first face image group and the second face image group in such a manner that the face images belonging to the one group are distinguished from the face images belonging to the other group of the first face image group and the second face image group.

2. The electronic apparatus according to claim 1, wherein the plurality of attribute sections include at least a commercial section and a main section other than the commercial section,
the face image list display process module is configured to display, on the display area, each face image belonging to the commercial section and each face image belonging to the main section such that each face image belonging to the commercial section is distinguished from each face image belonging to the main section.

3. The electronic apparatus according to claim 1, wherein the plurality of attribute sections include a commercial section, a music section in which music is played, and a talk section in which a talk is made.

4. The electronic apparatus according to claim 1, wherein the face image indexing information includes time stamp information which is indicative of a time point at which each of the face images appears in the video content data,
the face image list display process module is configured to classify the plurality of face images into the first face image group and the second face image group, on the basis of the section attribute information and the time stamp information corresponding to each of the plurality of face images.

5. The electronic apparatus according to claim 1, wherein the face image list display process module is configured to display, on the display area, the face images belonging to the one group in a state in which the face images belonging to the other group are not displayed, thereby to display the face images belonging to the one group in the manner that the face images belonging to the one group are distinguished from the face images belonging to the other group.

6. The electronic apparatus according to claim 1, wherein the face image list display process module further displays, on the basis of the section attribute information, a section bar including a bar area which is indicative of a position of the predetermined attribute section in a sequence from a start position to an end position of the video content data.

7. The electronic apparatus according to claim 6, wherein the face image list display process module is configured to display, on the display area, a list of face images in one display mode which is selected from a plurality of display modes including a first display mode in which a list of a plurality of face images included in the face image indexing information is displayed on the display area and a second display mode in which the face images belonging to one group of the first face image group and the second face image group are displayed on the display area in such a manner that the face images belonging to the one group are distinguished from the face images belonging to the other group of the first face image group and the second face image group, and the face image list display process module switches the display mode to be used from the first display mode to the second display mode if the bar area of the section bar is selected by a user in a state in which the list of the face images is displayed on the display area in the first mode.

8. The electronic apparatus according to claim 1, wherein in a case where the predetermined attribute section includes a plurality of partial sections which are dispersedly present in a sequence from a start position to an end position of the video content data, the face image list display process module further displays a section bar including a plurality of bar areas which are indicative of positions of the plurality of partial sections in the sequence from the start position to the end position of the video content data.

9. The electronic apparatus according to claim 8, wherein the face image list display process module is configured to display, on the display area, a list of face images in one display mode which is selected from a plurality of display modes including a first display mode in which a list of a plurality of face images included in the face image indexing information is displayed on the display area and a second display mode in which the face images belonging to one group of the first face image group and the second face image group are displayed on the display area in such a manner that the face images belonging to the one group are distinguished from the face images belonging to the other group of the first face image group and the second face image group, and the face image list display process module switches, in a case where one of the plurality of bar areas of the section bar is selected by a user in a state in which the list of the face images is displayed on the display area in the first mode, the display mode to be used from the first display mode to the second display mode and displays the face images, which belong to the partial section corresponding to the selected bar area, in such a manner that the face images belonging to the partial section corresponding to the selected bar area are distinguished from the other face images.

10. The electronic apparatus according to claim 1, wherein the section attribute information includes level information which is indicative of at least one of a cheer level and an excitement level in association of each of partial data of the video content data, and
the face image list display process module further displays, on the basis of the level information, level display information which is indicative of at least one of a variation of the cheer level and a variation of the excitement level in a sequence from a start position to an end position of the video content data.

11. The electronic apparatus according to claim 1, further comprising a playback process module which starts, if an event of instructing playback of the video content data is input in a state in which one of the face images displayed on the display area is selected by a user, the playback of the video content data from a time point corresponding to a time point at which the selected face image appears, on the basis of the time stamp information.

12. The electronic apparatus according to claim 1, wherein the display area includes a plurality of face image display areas which are arranged in a matrix including a plurality of rows and a plurality of columns, and a plurality of time zones, which constitute a total time length of the video content data, are allocated to the plurality columns, respectively, and
the face image list display process module is configured to display, on the display area, a list of face images in one display mode which is selected from a plurality of display modes including a first display mode in which face images belonging to the time zone allocated to each column are arranged and displayed on the face image display areas of each column, on the basis of the time stamp information corresponding to each of the plurality of face images, and a second display mode in which the face images belonging to one group of the first face image group and the second face image group are displayed on the display area in such a manner that the face images belonging to the one group are distinguished from the face images belonging to the other group of the first face image group and the second face image group.

13. An electronic apparatus comprising:
an indexing process module configured to execute a first indexing process of extracting a plurality of face images from motion video data which is included in video content data, and a second indexing process of analyzing the video content data and outputting section attribute information which specifies a start time point and an end time point of at least one predetermined attribute section of a plurality of attribute sections in the video content data; and
a face image list display process module configured to display a list of the extracted face images on a display area, the face images being arranged and displayed on face image display areas,
wherein the face image list display process module is configured to detect face images belonging to the predetermined attribute section, and to display the detected face images on the display area in such a manner that the detected face images are distinguished from the other face images.

14. The electronic apparatus according to claim 13, wherein the face image list display process module is configured to display, on the basis of the section attribute information, a section bar including a bar area which is indicative of a position of the predetermined attribute section in a sequence from a start position to an end position of the video content data, and to display the detected face images on the display area in such a manner that the detected face images are distinguished from the other face images if the bar area of the section bar is selected by a user.

15. The electronic apparatus according to claim 13, wherein the plurality of attribute sections include at least a commercial section and a main section other than the commercial section,
the face image list display process module is configured to display, on the display area, each face image belonging to the commercial section and each face image belonging to the main section such that each face image belonging to the commercial section is distinguished from each face image belonging to the main section.

16. The electronic apparatus according to claim 13, wherein the plurality of attribute sections include the commercial section, a music section in which music is played, and a talk section in which a talk is made.

17. The electronic apparatus according to claim 13, wherein the face image indexing information includes time stamp information which is indicative of a time point at which each of the face images appears in the video content data, the face image list display process module is configured to detect the face images belonging to the predetermined attribute section, on the basis of the section attribute information and the time stamp information corresponding to each of the plurality of face images.

18. A method of displaying a list of face images which appear in video content data, comprising:
executing a first indexing process of extracting a plurality of face images from motion video data which is included in video content data, and a second indexing process of analyzing the video content data and outputting section attribute information which specifies a start time point and an end time point of at least one predetermined attribute section of a plurality of attribute sections in the video content data;
classifying the extracted face images into a first face image group belonging to the predetermined attribute section and a second face image group belonging to the sections other than the predetermined attribute section; and
displaying, on a display area, the face images belonging to one group of the first face image group and the second face image group in such a manner that the face images belonging to the one group are distinguished from the face images belonging to the other group of the first face image group and the second face image group.

19. A computer-readable, non-transitory medium having stored thereon a computer program which is executable by a computer, the computer program controlling the computer to execute functions of:
executing a first indexing process of extracting a plurality of face images from motion video data which is included in video content data, and a second indexing process of analyzing the video content data and outputting section attribute information which specifies a start time point and an end time point of at least one predetermined attribute section of a plurality of attribute sections in the video content data;
classifying the extracted face images into a first face image group belonging to the predetermined attribute section and a second face image group belonging to the sections other than the predetermined attribute section; and
displaying, on a display area, the face images belonging to one group of the first face image group and the second face image group in such a manner that the face images belonging to the one group are distinguished from the face images belonging to the other group of the first face image group and the second face image group.

* * * * *